US012763440B2

(12) United States Patent
Lin et al.

(10) Patent No.: US 12,763,440 B2
(45) Date of Patent: Oct. 13, 2026

(54) BATTERY CELL, BATTERY, AND ELECTRIC DEVICE

(71) Applicant: CONTEMPORARY AMPEREX TECHNOLOGY CO., LIMITED, Ningde (CN)

(72) Inventors: Denghua Lin, Ningde (CN); Quankun Li, Ningde (CN); Wenwei Chen, Ningde (CN); Yulian Zheng, Ningde (FJ); Peng Wang, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/366,501

(22) Filed: Oct. 22, 2025

(65) Prior Publication Data

US 2026/0188874 A1 Jul. 2, 2026

Related U.S. Application Data

(63) Continuation of application No. PCT/CN2024/074188, filed on Jan. 26, 2024.

(30) Foreign Application Priority Data

Jul. 11, 2023 (CN) ........................ 202321815773.6

(51) Int. Cl.
*H01M 50/566* (2021.01)
*B60L 50/64* (2019.01)
(Continued)

(52) U.S. Cl.
CPC ....... *H01M 50/566* (2021.01); *H01M 50/103* (2021.01); *H01M 50/15* (2021.01);
(Continued)

(58) Field of Classification Search
CPC ............................ H01M 50/566; H01M 50/15
See application file for complete search history.

(56) References Cited

U.S. PATENT DOCUMENTS

| | | | | |
|---|---|---|---|---|
| 2011/0159353 A1* | 6/2011 | Byun | .................. | H01M 50/505 429/160 |
| 2019/0386263 A1* | 12/2019 | Bai | ....................... | H01M 50/55 |

(Continued)

FOREIGN PATENT DOCUMENTS

| | | |
|---|---|---|
| CN | 215988974 U | 3/2022 |
| CN | 115552702 A | 12/2022 |

(Continued)

OTHER PUBLICATIONS

The Grant Notice received in the counterpart CN application No. 202321815773.6, dated Jan. 4, 2024, 3 pages with English translation.

(Continued)

*Primary Examiner* — Maria Laios
*Assistant Examiner* — Benjamin T Lustgraaf
(74) *Attorney, Agent, or Firm* — K&L Gates LLP

(57) ABSTRACT

A battery cell, a battery, and an electric device. The battery cell includes a housing, an electrode terminal, and a first connector. The housing has a first wall portion with a lead-out hole. The electrode terminal includes a body portion and a flange portion. The body portion is at least partially inserted into the lead-out hole, and the flange portion is connected to one end of the body portion along the thickness direction of the first wall. The flange is positioned on one side of the wall and includes a first end surface facing away from the body portion. A groove is formed in the electrode terminal, with a groove side surface connected to the first end surface. The first connector is welded to the electrode terminal at a weld mark, while a portion of the
(Continued)

groove side surface within the flange does not contact the weld mark.

19 Claims, 8 Drawing Sheets

(51) Int. Cl.

| | |
|---|---|
| ***H01M 50/103*** | (2021.01) |
| ***H01M 50/15*** | (2021.01) |
| ***H01M 50/186*** | (2021.01) |
| ***H01M 50/55*** | (2021.01) |
| ***H01M 50/557*** | (2021.01) |

(52) U.S. Cl.

CPC ......... *H01M 50/186* (2021.01); *H01M 50/55* (2021.01); *H01M 50/557* (2021.01); *B60L 50/64* (2019.02); *H01M 2220/20* (2013.01)

(56) References Cited

U.S. PATENT DOCUMENTS

| | | | | |
|---|---|---|---|---|
| 2021/0074963 | A1 * | 3/2021 | Zhang ................. | H01M 50/533 |
| 2023/0055271 | A1 | 2/2023 | Fang et al. | |

FOREIGN PATENT DOCUMENTS

| | | | |
|---|---|---|---|
| CN | 218602700 | U | 3/2023 |
| CN | 219017870 | U | 5/2023 |
| CN | 219067004 | U | 5/2023 |
| JP | 2009259524 | A | 11/2009 |
| JP | 2014165155 | A | 9/2014 |

OTHER PUBLICATIONS

First Amendment Notice received in the counterpart CN application No. 202321815773.6, dated Nov. 30, 2023, 3 pages with English translation.

The international search report received in the counterpart international application PCT/CN2024/074188, dated Apr. 1, 2024, 5 pages with English translation.

The ISA written opinion received in the counterpart international application PCT/CN2024/074188, dated Apr. 1, 2024, 6 pages with English translation.

Office Action (with English Machine Translation), mailed May 19, 2026, for corresponding Japanese Patent Application Serial No. 2025-538248.

Partial Supplementary European Search Report, mailed Apr. 24, 2026, for corresponding European Patent Application Serial No. 24838269.9.

* cited by examiner

BATTERY CELL, BATTERY, AND ELECTRIC DEVICE

CROSS-REFERENCE TO RELATED APPLICATIONS

This application is a continuation of International Application No. PCT/CN2024/074188, filed on Jan. 26, 2024, which claims priority to the Chinese Patent Application 202321815773.6 filed on Jul. 11, 2023 and entitled "BATTERY CELL, BATTERY, AND ELECTRIC DEVICE", which is incorporated herein by reference with its entirety.

TECHNICAL FIELD

This application relates to the field of battery technology, and specifically relates to a battery cell, a battery, and an electric device.

BACKGROUND

With the development of new energy technologies, batteries are increasingly widely used, for example, in mobile phones, notebook computers, electric scooters, electric vehicles, electric airplanes, electric ships, electric toy cars, electric toy ships, electric toy airplanes, and electric tools.

In the development of battery technology, in addition to improving the performance of battery cells, reliability is also a factor to be considered. Therefore, how to improve the reliability of battery cells is an urgent issue to be addressed in battery technology.

SUMMARY

Embodiments of this application provide a battery cell, a battery, and an electric device, which can effectively improve the reliability of the battery cell.

An embodiment of this application provides a battery cell, including a housing, an electrode terminal, and a first connector. The housing includes a first wall portion, and the first wall portion is provided with a lead-out hole running through the first wall portion. The electrode terminal includes a body portion and a flange portion; the body portion is at least partially inserted into the lead-out hole; and along a thickness direction of the first wall portion, the flange portion is connected to one end of the body portion, the flange portion is located on one side of the first wall portion, and the flange portion has a first end surface facing away from the body portion. The electrode terminal is provided with a groove, and the groove has a first groove side surface connected to the first end surface. The first connector is welded to the electrode terminal to form a weld mark portion, and a portion of the first groove side surface located in the flange portion does not contact the weld mark portion.

In the above technical solution, the portion of the first groove side surface located in the flange portion does not contact the weld mark portion, and the first connector is not welded to the portion, whose dimensional accuracy is difficult to control, of the first groove side surface located in the flange portion, effectively improving the welding quality between the first connector and the electrode terminal, enhancing the welding strength between the first connector and the electrode terminal, and thus improving the reliability of the battery cell.

In some embodiments, the groove has a second groove side surface, and along the thickness direction, the second groove side surface is located on a side of the first groove side surface facing away from the first end surface. The first connector includes a first connecting portion, the first connecting portion is at least partially accommodated in the groove, the first connecting portion has a first outer circumferential surface, and the first outer circumferential surface is welded to the second groove side surface to form the weld mark portion. Welding the first outer circumferential surface to the second groove side surface enables no contact between the weld mark portion and the portion of the first groove side surface located in the flange portion. Since the second groove side surface is located on the side of the first groove side surface facing away from the first end surface, the flange portion is unlikely to affect the second groove side surface during a forming process, and the dimensional accuracy of the second groove side surface is easily controlled, thereby improving the fitting accuracy between the second groove side surface and the first outer circumferential surface, achieving high-quality welding between the second groove side surface and the first outer circumferential surface, and improving the welding quality between the first connector and the electrode terminal.

In some embodiments, the groove includes a first groove and a second groove; the first groove is provided on the first end surface, and a groove side surface of the first groove is a first groove side surface; the second groove is provided on a groove bottom surface of the first groove, the first connecting portion is at least partially located in the second groove, and a groove side surface of the second groove is a second groove side surface. This simplifies the structure of the groove and reduces the difficulty of forming the groove. Additionally, the first connecting portion is at least partially located in the second groove, and the first outer circumferential surface is welded to the second groove side surface to seal the second groove.

In some embodiments, the first connecting portion has a first surface facing away from a groove bottom surface of the second groove, and the first surface is connected to the first outer circumferential surface; the first surface is flush with the groove bottom surface of the first groove; or, the first surface is farther from the groove bottom surface of the second groove than the groove bottom surface of the first groove. This makes the first connecting portion closer to an opening of the groove and prevents the first connecting portion from being located too deep in the second groove, facilitating the welding of the first outer circumferential surface of the first connecting portion to the second groove side surface.

In some embodiments, the first connector further includes a second connecting portion, the second connecting portion is made of a different material from the first connecting portion, and the second connecting portion is composited on the first surface. The second connecting portion may be configured to be connected to another component, enabling electrical connection between the electrode terminal and the another component made of a different material. Additionally, since the second connecting portion is composited on the first surface of the first connecting portion, the second connecting portion is located outside the second groove, facilitating connection of the second connecting portion to another component.

In some embodiments, along the thickness direction, the flange portion is located on a side of the first wall portion facing away from an interior of the housing, and the first connector has a second surface farthest from the groove bottom surface of the second groove; the second surface is flush with the first end surface; or, the second surface is farther from the groove bottom surface of the second groove than the first end surface. Since the flange portion is located on the side of the first wall portion facing away from the interior of the housing, the first connector may be configured to be connected to an external component. Since the second surface is flush with the first end surface, or the second surface is farther from the groove bottom surface of the second groove than the first end surface, the second surface can contact an external component when the second connecting portion is connected to the external component, thereby enhancing the connection strength between the second connecting portion and the external component.

In some embodiments, the first outer circumferential surface and the second groove side surface are conical surfaces that fit with each other; or, the first outer circumferential surface and the second groove side surface are both parallel to the thickness direction. If the first outer circumferential surface and the second groove side surface are conical surfaces that fit with each other, they can limit the first connecting portion along the thickness direction, reducing the difficulty of welding the first connector to the electrode terminal. If the first outer circumferential surface and the second groove side surface are both parallel to the thickness direction, the forming difficulty of the first outer circumferential surface and the second groove side surface is lower, making it easier to control the fitting accuracy of the first outer circumferential surface and the second groove side surface at a high level.

In some embodiments, the first connector covers the groove, and the first connector is welded to the first end surface to form the weld mark portion. Welding the first connector to the first end surface enables no contact between the weld mark portion and the portion of the first groove side surface located in the flange portion. The flange portion is unlikely to affect the first end surface during the forming process, achieving high-quality welding between the first connector and the first end surface, and improving the welding quality between the first connector and the electrode terminal. Additionally, this structure allows the first connector to be located outside the groove, facilitating connection of the first connector to another component to achieve electrical connection between the electrode terminal and the another component.

In some embodiments, the first connector includes a first connecting portion welded to the first end surface, a thickness of the first connecting portion is $H_1$, a thickness of the flange portion is $H_2$, and $H_1/H_2 \leq 0.9$. This ensures that the thickness of the first connecting portion is not excessively large, allowing welding heat to be easily transferred from the first connecting portion to the flange portion while the first connecting portion is welded to the flange portion through penetration welding, improving the welding quality between the first connecting portion and the flange portion.

In some embodiments, $H_1/H_2 \leq 0.5$.

In some embodiments, the first connector further includes a second connecting portion, the second connecting portion is made of a different material from the first connecting portion, and along the thickness direction, the second connecting portion is located on a side of the first connecting portion facing away from the first end surface, and the second connecting portion and the first connecting portion are composited. The second connecting portion may be configured to be connected to another component, enabling electrical connection between the electrode terminal and the another component made of a different material.

In some embodiments, the first connecting portion includes a first connection region, orthographic projections of the first connection region and the second connecting portion along the thickness direction do not overlap, and the first connection region is welded to the first end surface to form the weld mark portion. This ensures that the second connecting portion is unlikely to cause interference to the welding of the first connecting portion to the electrode terminal, making it easier to weld the first connecting portion to the first end surface.

In some embodiments, the flange portion is located on a side of the first wall portion facing away from the interior of the housing. This allows the flange portion to be located on the outer side of the first wall portion, and allows the electrode terminal to be flanged outside the housing to form the flange portion during flanging of the electrode terminal, effectively reducing the difficulty of forming the flange portion.

In some embodiments, the battery cell further includes an electrode assembly, the electrode assembly is accommodated in the housing, the electrode assembly includes a first tab, and the first tab is electrically connected to the electrode terminal. A groove bottom wall of the groove is provided with a first through hole, the first through hole enables communication between the groove and the interior of the housing, and the first tab is inserted into the first through hole and partially accommodated in the groove. Since the flange portion is located on the side of the first wall portion facing away from the interior of the housing, an opening of the groove formed at the first end surface faces the exterior of the housing, and since the first tab passes through the first through hole and is partially located in the groove, it is easy to store and organize the first tab within the groove through the opening of the groove or to perform an electrical connection operation between the first tab and the electrode terminal, thereby reducing the production difficulty of the battery cell. Additionally, since the first tab is at least partially located in the groove, the space occupied by the first tab inside the housing can be reduced, and more space is provided for an active material coating portion of the electrode assembly, which is conducive to increasing the volumetric energy density of the battery cell.

In some embodiments, the first tab includes a first tab portion located in the groove, and the first tab portion is connected to the groove bottom wall of the groove. When the first tab and the electrode terminal are electrically connected, the first tab portion located in the groove is connected to the groove bottom wall of the groove more easily and more conveniently, facilitating large-area contact between the first tab and the electrode terminal, and increasing a current-carrying area therebetween.

In some embodiments, the first connector seals the groove to form an accommodating cavity inside the electrode terminal, the first connector is configured to isolate the accommodating cavity from the exterior of the housing, and the accommodating cavity is in communication with the interior of the housing through the first through hole. Since the accommodating cavity is in communication with the interior of the housing through the first through hole, the accommodating cavity can serve as a buffer and temporary storage structure for an electrolyte, allowing the battery cell to accommodate more electrolyte inside, and since the electrolyte is consumed during charging and discharging processes of the battery cell, providing more electrolyte can extend the service life of the battery cell; and the accommodating cavity can also serve as an accommodating and buffer structure for gases inside the battery cell, reducing the swelling of the battery cell, and improving the reliability and stability of the battery cell.

In some embodiments, the first connector includes a first connecting portion and a second connecting portion. The first connecting portion is welded to the electrode terminal to form the weld mark portion, and the first connecting portion seals the groove. The second connecting portion is made of a different material from the first connecting portion, the second connecting portion and the first connecting portion are composited to form a composite interface, and the composite interface is located outside the accommodating cavity. This ensures that the electrolyte entering the accommodating cavity does not contact the composite interface, reducing the risk of corrosion of the composite interface due to local formation of a primary cell, and reducing the risk of separation of the first connecting portion and the second connecting portion under the corrosion of the electrolyte.

In some embodiments, along the thickness direction, the first connecting portion and the second connecting portion are stacked, and the second connecting portion is located on a side of the first connecting portion facing away from the accommodating cavity. The flange portion is located on the outer side of the first wall portion, and the second connecting portion is located on the side of the first connecting portion facing away from the accommodating cavity, facilitating connection of the second connecting portion to an external component.

In some embodiments, the first connector is at least partially accommodated in the groove, and the first connector is welded to the groove bottom wall of the groove to form the weld mark portion. Welding the first connecting portion to the groove bottom wall of the groove enables no contact between the weld mark portion and the portion of the first groove side surface located in the flange portion. The groove bottom wall of the groove is farther from the first groove side surface, and the flange portion is unlikely to affect the groove bottom wall of the groove during the forming process, achieving high-quality welding between the first connector and the groove bottom wall of the groove, and improving the welding quality between the first connector and the electrode terminal.

In some embodiments, the flange portion is located on a side of the first wall portion facing the interior of the housing. This allows the opening of the groove formed at the first end surface to face the interior of the housing, and thus the first connector accommodated in the groove is located inside the housing, so that the first connector is hidden. Additionally, since the flange portion is located on the inner side of the first wall portion, the flange portion is unlikely to affect the portion of the electrode terminal located on the outer side of the first wall portion during the forming process, which is conducive to enhancing the connection strength between the electrode terminal and the external component.

In some embodiments, the battery cell further includes an electrode assembly, the electrode assembly is accommodated in the housing, and the electrode assembly includes a first tab. The first connector connects the first tab and the electrode terminal to achieve electrical connection between the first tab and the electrode terminal. The first connector serves as a component for electrically connecting the first tab and the electrode terminal, and since the first connector is at least partially accommodated in the groove, the space occupied by the first connector inside the housing can be reduced, and more space is provided for the active material coating portion of the electrode assembly, which is conducive to increasing the volumetric energy density of the battery cell.

In some embodiments, the first tab is at least partially accommodated in the groove. The groove can provide space to accommodate the first tab, reducing the space occupied by the first tab inside the housing, and providing more space for the active material coating portion of the electrode assembly, which is conducive to increasing the volumetric energy density of the battery cell.

In some embodiments, the first connector includes a third connecting portion and a fourth connecting portion, the fourth connecting portion is connected to an end of the third connecting portion, and an end of the third connecting portion away from the fourth connecting portion is welded to the groove bottom wall of the groove to form the weld mark portion. The third connecting portion surrounds the fourth connecting portion, the third connecting portion and the fourth connecting portion jointly define an accommodating space, the fourth connecting portion is provided with a second through hole, the second through hole enables communication between the accommodating space and the interior of the housing, and the first tab is inserted into the second through hole and partially accommodated in the accommodating space. The first tab being partially accommodated in the accommodating space can reduce the space occupied by the first tab inside the housing, providing more space for the active material coating portion of the electrode assembly, which is conducive to increasing the volumetric energy density of the battery cell. Additionally, since the accommodating space is in communication with the interior of the housing through the second through hole, the accommodating space can serve as a buffer and temporary storage structure for the electrolyte, allowing the battery cell to accommodate more electrolyte inside, thereby extending the service life of the battery cell. The accommodating space can also serve as an accommodating and buffer structure for gases inside the battery cell, reducing the swelling of the battery cell, and improving the reliability and stability of the battery cell.

In some embodiments, the first tab includes a first tab portion located in the accommodating space, and the first tab portion is connected to the fourth connecting portion. When the first tab and the first connector are electrically connected, the first tab portion located in the accommodating space is connected to the fourth connecting portion more easily and more conveniently, facilitating large-area contact between the first tab and the first connector, and increasing a current-carrying area therebetween.

In some embodiments, along the thickness direction, the first connector has a third surface farthest from the groove bottom wall of the groove; the third surface is flush with the first end surface; or, the third surface is closer to the groove bottom wall of the groove than the first end surface. This ensures that the first connector is entirely located in the groove, reducing the space occupied by the first connector inside the housing. Additionally, when the first tab passes through the second through hole to be connected to the fourth connecting portion, the first tab needs to be bent, and the first connector being entirely located in the groove can reduce the risk of the first connecting portion occupying the space for bending the tab, and reduce the risk of local cracking of the first tab.

In some embodiments, the groove has a second groove side surface, and the second groove side surface is located on a side of the first groove side surface facing away from the first end surface; the first connector has a second outer circumferential surface; and the second outer circumferential surface is in a contact fit with the second groove side surface. This enables positioning and fitting between the first connector and the electrode terminal, facilitates precise welding between the first connector and the electrode terminal, and improves the welding quality between the first connector and the electrode terminal.

In some embodiments, the battery cell further includes a second connector, the second connector is made of a different material from the electrode terminal, the second connector and the electrode terminal are composited, and the second connector is located on a side of the electrode terminal facing away from the interior of the housing. The second connector may be configured to be connected to an external component, enabling electrical connection between the electrode terminal and the external component made of a different material.

In some embodiments, along the thickness direction, the second connector and the groove bottom wall of the groove are stacked. The groove bottom wall of the groove includes a second connection region, orthographic projections of the second connection region and the second connector along the thickness direction do not overlap, and the second connection region is welded to the first connector to form the weld mark portion. This ensures that the second connector is unlikely to cause interference to the welding of the groove bottom wall of the groove to the first connector, making it easier to weld the groove bottom wall of the groove to the first connector.

In some embodiments, when viewed along the thickness direction, the second connection region surrounds an outer side of the second connector. This simplifies the structure of the second connector.

In some embodiments, the second connector has a hollow region, and the groove bottom wall of the groove forms the second connection region at a position corresponding to the hollow region. During welding, the groove bottom wall of the groove and the first connector can be welded at the hollow region of the second connector, improving the welding accuracy and improving the welding precision between the groove bottom wall of the groove and the first connector.

In some embodiments, the second connector includes a fifth connecting portion and a sixth connecting portion, both the fifth connecting portion and the sixth connecting portion are connected to the electrode terminal, the fifth connecting portion surrounds the sixth connecting portion, an annular gap is formed between the fifth connecting portion and the sixth connecting portion, and the annular gap is the hollow region. During welding, the groove bottom wall of the groove and the first connector can be welded along the annular gap, so that the weld mark portion formed by the welding of them extends along an extension direction of the annular gap, which is conducive to enhancing the connection strength between the groove bottom wall of the groove and the first connector.

In some embodiments, the housing includes a shell and an end cover, the shell has an opening, and the end cover seals the opening. The end cover is the first wall portion; and/or, at least one wall portion of the shell is the first wall portion.

According to a second aspect, an embodiment of this application provides a battery including the battery cell provided in any one of the embodiments of the first aspect.

According to a third aspect, an embodiment of this application provides an electric device including the battery cell provided in any one of the embodiments of the first aspect.

BRIEF DESCRIPTION OF DRAWINGS

To more clearly illustrate the technical solutions of the embodiments of this application, the drawings required for use in the embodiments are briefly described below. It should be understood that the following drawings only show some embodiments of this application and therefore should not be regarded as limiting the scope. For those of ordinary skill in the art, other related drawings can be obtained based on these drawings without creative effort.

Figure 1:
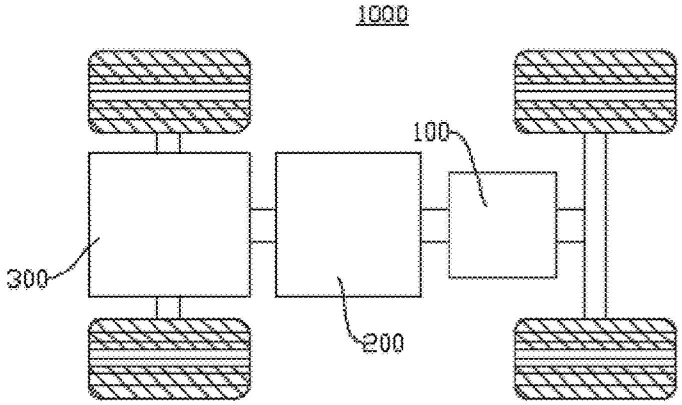
FIG. 1 is a schematic structural diagram of a vehicle according to some embodiments of this application.

Reference signs: 1. housing; 11. shell; 12. end cover; 13. first wall portion; 131. lead-out hole; 2. electrode assembly; 21. first tab; 211. first tab portion; 212. second tab portion; 213. tab root; 22. active material coating portion; 3. electrode terminal; 31. body portion; 32. flange portion; 321. first end surface; 322. second end surface; 33. groove; **33*a*. accommodating cavity; 331. first groove; 3311. first groove side surface; 3312. first groove bottom surface; 332. second groove; 3321. second groove side surface; 3322. second groove bottom surface; 333. groove bottom wall of groove; 3331. first through hole; 3332. second connection region; 34. limiting portion; 341. third end surface; 4. first insulating member; 5. first connector; 51. first connecting portion; 511. first outer circumferential surface; 512. first surface; 513. first connection region; 52. second connecting portion; 521. second surface; 53. composite interface; 54. third connecting portion; 541. second outer circumferential surface; 55. fourth connecting portion; 551. second through hole; 552. third surface; 56. accommodating space; 6. weld mark portion; 7. second insulating member; 8. sealing member; 9. second connector; 91. fifth connecting portion; 92. sixth connecting portion; 93. hollow region; 10. battery cell; 20. box; 201. first part; 202. second part; 100. battery; 200. controller; 300. motor; 1000**. vehicle; and Z. thickness direction.

DESCRIPTION OF EMBODIMENTS

To make the objectives, technical solutions, and advantages of the embodiments of this application clearer, the technical solutions in the embodiments of this application are clearly described below with reference to the drawings in the embodiments of this application. Apparently, the described embodiments are some rather than all of the embodiments of this application. Based on the embodiments in this application, all other embodiments obtained by those of ordinary skill in the art without creative effort fall within the protection scope of this application.

Unless otherwise defined, all technical and scientific terms used in this application have the same meanings as commonly understood by those skilled in the technical field of this application; the terms used in the specification of this application are for the purpose of describing specific embodiments only and are not intended to limit this application; the terms "include", "comprise", and any variations thereof in the specification, claims, and the above description of the drawings of this application are intended to cover non-exclusive inclusion. In the specification, claims, or accompanying drawings of this application, the terms "first", "second", and the like are intended to distinguish between different objects rather than to describe a particular order or a primary-secondary relationship.

Reference to "embodiment" in this application means that a specific feature, structure, or characteristic described in connection with the embodiment may be included in at least one embodiment of this application. The appearance of this phrase in various places in the specification does not necessarily refer to the same embodiment, nor is it an independent or alternative embodiment mutually exclusive with other embodiments.

In the description of this application, it should be noted that unless otherwise specified and defined explicitly, the terms "mounting", "connection", "join", and "attachment" should be understood in their general senses. For example, they may refer to a fixed connection, a detachable connection, or an integral connection; and may be a direct connection, an indirect connection via an intermediate medium, or an internal communication between two elements. For those of ordinary skill in the art, the specific meanings of the above terms in this application can be understood based on specific circumstances.

The term "and/or" in this application is merely an association relationship describing associated objects, indicating that three relationships may exist. For example, A and/or B may indicate: only A is present, both A and B are present, and only B is present. In addition, the character "/" in this application generally indicates an "or" relationship between the contextually associated objects.

In the embodiments of this application, the same reference signs denote the same components. For brevity, in different embodiments, detailed descriptions of the same components are not repeated. It should be understood that the thickness, length, width, and other dimensions of various components in the embodiments of this application shown in the drawings, as well as the overall thickness, length, width, and other dimensions of an integrated device, are for illustrative purposes only and should not constitute any limitation to this application.

The term "a plurality of" appearing in this application refers to two or more (including two).

In the embodiments of this application, the battery cell may be a secondary battery, and the secondary battery refers to a battery cell that can be recharged to activate active materials for continuous use after the battery cell is discharged.

Battery cells include, but are not limited to, lithium-ion batteries, sodium-ion batteries, sodium-lithium-ion batteries, lithium metal batteries, sodium metal batteries, lithium-sulfur batteries, magnesium-ion batteries, nickel-metal hydride batteries, nickel-cadmium batteries, and lead-acid batteries.

A battery cell typically includes an electrode assembly. The electrode assembly includes a positive electrode, a negative electrode, and a separator. During charging and discharging of the battery cell, active ions (such as lithium ions) intercalate and deintercalate back and forth between the positive electrode and the negative electrode. The separator is disposed between the positive electrode and the negative electrode, reducing the risk of short-circuiting between the positive and negative electrodes while allowing active ions to pass through.

In some embodiments, the positive electrode may be a positive electrode plate, and the positive electrode plate may include a positive electrode current collector and a positive electrode active material arranged on at least one surface of the positive electrode current collector.

In an example, the positive electrode current collector includes two opposite surfaces in a thickness direction of the positive electrode current collector, and the positive electrode active material is arranged on either or both of the two opposite surfaces of the positive electrode current collector.

In an example, the positive electrode current collector may be a metal foil or a composite current collector. For example, as a metal foil, silver-plated aluminum, silver-plated stainless steel, stainless steel, copper, aluminum, nickel, baked carbon, carbon, nickel, or titanium may be used. The composite current collector may include a polymer material matrix and a metal layer. The composite current collector may be formed by forming a metal material (aluminum, aluminum alloy, nickel, nickel alloy, titanium, titanium alloy, silver, silver alloy, or the like) on a polymer material matrix (for example, a matrix of polypropylene, polyethylene terephthalate, polybutylene terephthalate, polystyrene, or polyethylene).

In an example, the positive electrode active material may include at least one of the following materials: lithium-containing phosphate, lithium transition metal oxide, and respective modified compounds thereof. However, this application is not limited to these materials, and other conventional well-known materials that can be used as positive electrode active materials for batteries may alternatively be used. These positive electrode active materials may be used alone, or two or more of them are used in combination. Examples of the lithium-containing phosphate may include, but are not limited to, at least one of lithium iron phosphate (such as $LiFePO_4$ (also abbreviated as LFP)), a composite material of lithium iron phosphate and carbon, lithium manganese phosphate (such as $LiMnPO_4$), a composite material of lithium manganese phosphate and carbon, lithium iron manganese phosphate, and a composite material of lithium iron manganese phosphate and carbon. Examples of the lithium transition metal oxide may include, but are not limited to, at least one of lithium cobalt oxide (such as $LiCoO_2$), lithium nickel oxide (such as $LiNiO_2$), lithium manganese oxide (such as $LiMnO_2$ and $LiMn_2O_4$), lithium nickel cobalt oxide, lithium manganese cobalt oxide, lithium nickel manganese oxide, lithium nickel cobalt manganese oxide such as $LiNi_{1/3}Co_{1/3}Mn_{1/3}O_2$ (also abbreviated as NCM333), $LiNi_{0.5}Co_{0.2}Mn_{0.3}O_2$ (also abbreviated as NCM523), $LiNi_{0.5}Co_{0.25}Mn_{0.25}O_2$ (also abbreviated as NCM211), $LiNi_{0.6}Co_{0.2}Mn_{0.2}O_2$ (also abbreviated as NCM622), $LiNi_{0.8}Co_{0.1}Mn_{0.1}O_2$ (also abbreviated as NCM811), lithium nickel cobalt aluminum oxide (such as $LiNi_{0.85}Co_{0.15}Al_{0.05}O_2$), and modified compounds thereof.

In some embodiments, the positive electrode may employ a foam metal. The foam metal may be foam nickel, foam copper, foam aluminum, foam alloy, foam carbon, or the like. When the foam metal serves as the positive electrode, the surface of the foam metal may be provided with no positive electrode active material, or it may be provided with a positive electrode active material. In an example, the foam metal may also be filled and/or deposited with a lithium source material, potassium metal, or sodium metal, where the lithium source material is lithium metal and/or a lithium-rich material.

In some embodiments, the negative electrode may be a negative electrode plate, and the negative electrode plate may include a negative electrode current collector.

In an example, the negative electrode current collector may employ a metal foil, a foam metal, or a composite current collector. For example, as a metal foil, the negative electrode current collector may use silver-plated aluminum or stainless steel, stainless steel, copper, aluminum, nickel, baked carbon, carbon, nickel, or titanium. The foam metal may be foam nickel, foam copper, foam aluminum, foam alloy, foam carbon, or the like. The composite current collector may include a polymer material matrix and a metal layer. The composite current collector may be formed by forming a metal material (copper, copper alloy, nickel, nickel alloy, titanium, titanium alloy, silver, silver alloy, or the like) on a polymer material matrix (such as a matrix of polypropylene, polyethylene terephthalate, polybutylene terephthalate, polystyrene, or polyethylene).

In an example, the negative electrode plate may include a negative electrode current collector and a negative electrode active material disposed on at least one surface of the negative electrode current collector.

In an example, the negative electrode current collector has two opposite surfaces in a thickness direction of the negative electrode current collector, and the negative electrode active material is disposed on either or both of the two opposite surfaces of the negative electrode current collector.

In an example, the negative electrode active material may employ well-known negative electrode active materials for battery cells in the art. In an example, the negative electrode active material may include at least one of the following materials: artificial graphite, natural graphite, soft carbon, hard carbon, silicon-based material, tin-based material, lithium titanate, and the like. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, and other conventional materials that can be used as negative electrode active materials for batteries may alternatively be used. These negative electrode active materials may be used alone, or two or more of them are used in combination.

In some embodiments, the material of the positive electrode current collector may be aluminum, and the material of the negative electrode current collector may be copper.

In some embodiments, the separator is an isolating film. The isolating film may be any well-known porous structure isolating film with good chemical stability and mechanical stability.

In an example, the material of the isolating film may include at least one of glass fiber, non-woven fabric, polyethylene, polypropylene, and polyvinylidene fluoride. The isolating film may be a single-layer film or a multi-layer composite film. When the isolating film is a multi-layer composite film, the materials of the layers may be the same or different. The separator may be an independent component located between the positive electrode and the negative electrode, or may be attached to surfaces of the positive electrode and the negative electrode.

In some embodiments, the separator is a solid electrolyte. The solid electrolyte is disposed between the positive electrode and the negative electrode, and plays the roles of transporting ions and isolating the positive and negative electrodes.

In some embodiments, the battery cell further includes an electrolyte, and the electrolyte conducts ions between the positive and negative electrodes. The electrolyte may be in a liquid state, a gel state, or a solid state. The liquid electrolyte includes an electrolytic salt and a solvent.

In some embodiments, the electrolytic salt may include at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalate)borate, lithium bis(oxalate)borate, lithium difluoro(bisoxalato) phosphate, and lithium tetrafluoro(oxalate)phosphate.

In some embodiments, the solvent may include at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone. The solvent may also be an ether-based solvent. The ether-based solvent may include one or more of ethylene glycol dimethyl ether, ethylene glycol diethyl ether, diethylene glycol dimethyl ether, triethylene glycol dimethyl ether, tetraethylene glycol dimethyl ether, 1,3-dioxolane, tetrahydrofuran, methyltetrahydrofuran, diphenyl ether, and crown ether.

The gel-state electrolyte includes a polymer as a skeleton network of the electrolyte, paired with an ionic liquid-lithium salt.

The solid electrolyte includes a polymer solid electrolyte, an inorganic solid electrolyte, and a composite solid electrolyte.

In an example, the polymer solid electrolyte may be polyether (polyethylene oxide), polysiloxane, polycarbonate, polyacrylonitrile, polyvinylidene fluoride, polymethyl methacrylate, single-ion polymer, polyionic liquid-lithium salt, cellulose, or the like.

In an example, the inorganic solid electrolyte may include one or more of an oxide solid electrolyte (crystalline perovskite, sodium superionic conductor, garnet, or amorphous LiPON film), a sulfide solid electrolyte (crystalline lithium superionic conductor (lithium germanium phosphorus sulfide or argyrodite), or amorphous sulfide), a halide solid electrolyte, a nitride solid electrolyte, and a hydride solid electrolyte.

In an example, the composite solid electrolyte is formed by adding inorganic solid electrolyte fillers to a polymer solid electrolyte.

In some embodiments, the electrode assembly is a wound structure. The positive electrode plate and the negative electrode plate are wound into a wound structure.

In some embodiments, the electrode assembly is a laminated structure.

In an example, a plurality of positive electrode plates and a plurality of negative electrode plates may be provided, respectively; and the plurality of positive electrode plates and the plurality of negative electrode plates are alternately stacked.

In an example, a plurality of positive electrode plates may be provided, and the negative electrode plate is folded to form a plurality of stacked folding segments, with one positive electrode plate clamped between adjacent folding segments.

In an example, both the positive electrode plate and the negative electrode plate are folded to form a plurality of stacked folding segments.

In an example, a plurality of separators may be provided and are respectively disposed between any adjacent positive electrode plates or negative electrode plates.

In an example, the separator may be continuously disposed and are arranged between any adjacent positive electrode plates or negative electrode plates through folding or winding.

In some embodiments, the shape of the electrode assembly may be cylindrical, flat, prismatic, or the like.

In some embodiments, the electrode assembly is provided with tabs, and the tabs can conduct current from the electrode assembly. The tabs include a positive tab and a negative tab.

In some embodiments, the battery cell may include a housing. The housing is configured to encapsulate the electrode assembly, the electrolyte, and other components. The housing may be a steel housing, an aluminum housing, a plastic housing (for example, polypropylene), a composite metal housing (for example, a copper-aluminum composite housing), an aluminum-plastic film, or the like.

In an example, the battery cell may be a cylindrical battery cell, a prismatic battery cell, a pouch battery cell, or a battery cell of another shape. The prismatic battery cell includes a square shell battery cell, a blade-shaped battery cell, and a polygonal battery such as a hexagonal battery.

The battery mentioned in the embodiments of this application refers to a single physical module including one or more battery cells to provide higher voltage and capacity.

In some embodiments, the battery can be a battery module, and when there are a plurality of battery cells, the plurality of battery cells are arranged and fastened to form a battery module.

In some embodiments, the battery may be a battery pack, the battery pack includes a box and a battery cell, and the battery cell or battery module is accommodated in the box.

In some embodiments, the box may be used as a part of a chassis structure of a vehicle. For example, a part of the box may become at least a part of the chassis of a vehicle, or a part of the box may become at least parts of a cross beam and longitudinal beam of a vehicle.

In some embodiments, the battery may be an energy storage apparatus. The energy storage apparatus includes an energy storage container, an energy storage electric cabinet, and the like.

For a battery cell, the battery cell may include a housing, an electrode assembly, and an electrode terminal, the electrode assembly is accommodated in the housing, the electrode terminal is disposed on a wall portion of the housing, and the electrode terminal is electrically connected to a tab of the electrode assembly to input or output electrical energy through the electrode terminal.

To install the electrode terminal, a lead-out hole may be provided in the wall portion, and after the electrode terminal passes through the lead-out hole, the electrode terminal may be flanged to form a flange portion, so that the electrode terminal is fixed to the wall portion. After the flange portion is formed on the electrode terminal, an end surface of the flange portion is provided with a groove, and the groove has a first groove side surface connected to the end surface.

To achieve electrical connection between the electrode terminal and another component, a connector connected to the electrode terminal may be provided in the battery cell. The connector may be a conductive member connecting the electrode terminal to the electrode assembly or connecting the electrode terminal to an external component. For a typical battery cell, the connector is generally located in the groove and welded to a portion of the first groove side surface located in the flange portion. However, since the flange portion is formed by flanging the electrode terminal, the dimensional accuracy of the portion of the first groove side surface located in the flange portion is difficult to control, and before welding, a gap between the connector and the first groove side surface is likely to be too large, which can easily lead to poor welding between the connector and the electrode terminal, affecting the welding quality between the connector and the electrode terminal, and thus affecting the reliability of the battery cell.

In view of this, an embodiment of this application provides a technical solution, in which there is no contact between the weld mark portion formed by welding the connector to the electrode terminal and the portion of the first groove side surface located in the flange portion, so that the welding quality between the connector and the electrode terminal can be effectively improved, improving the reliability of the battery cell.

The technical solution described in this embodiment of this application is applicable to batteries and electric devices using batteries.

The electric device may be a vehicle, a mobile phone, a portable device, a notebook computer, a ship, a spacecraft, an electric toy, an electric tool, or the like. The vehicle may be a fuel vehicle, a gas vehicle, or a new energy vehicle, and the new energy vehicle may be a battery electric vehicle, a hybrid vehicle, or an extended-range vehicle; the spacecraft includes airplanes, rockets, space shuttles, spaceships, and the like; the electric toy includes fixed or mobile electric toys, such as game consoles, electric toy cars, electric toy ships, and electric toy airplanes; the electric tool includes electric metal cutting tools, electric grinding tools, electric assembly tools, and railway electric tools, such as electric drills, electric grinders, electric wrenches, electric screwdrivers, electric hammers, impact drills, concrete vibrators, and electric planers.

For convenience of explanation, the electric device being a vehicle is used as an example in the following embodiments.

Referring to FIG. 1, FIG. 1 is a schematic structural diagram of a vehicle 1000 according to some embodiments of this application. The vehicle 1000 is provided with a battery 100 inside, and the battery 100 may be disposed at the bottom, front, or rear of the vehicle 1000. The battery 100 may be used for supplying power to the vehicle 1000. For example, the battery 100 may serve as an operational power source for the vehicle 1000.

The vehicle 1000 may further include a controller 200 and a motor 300, the controller 200 is configured to control the battery 100 to supply power to the motor 300, for example, for the operation power demands during the startup, navigation, and driving of the vehicle 1000.

In some embodiments of this application, the battery 100 may serve as not only an operational power source for the vehicle 1000 but also a driving power source for the vehicle 1000, replacing or partially replacing fuel or natural gas to provide driving power for the vehicle 1000.

Figure 2:
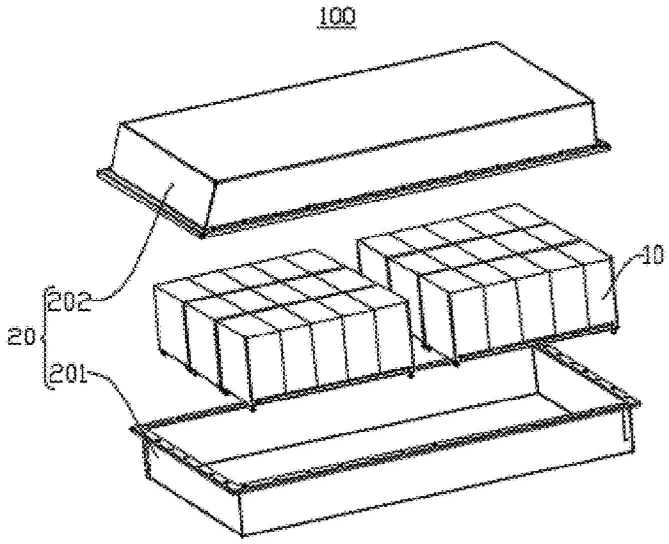
FIG. 2 is an exploded view of a battery according to some embodiments of this application.

Referring to FIG. 2, FIG. 2 is an exploded view of a battery 100 according to some embodiments of this application. The battery 100 includes a battery cell 10 and a box 20, and the battery cell 10 is accommodated in the box 20.

The box 20 is a component for accommodating the battery cell 10, and the box 20 may adopt various structures. In some embodiments, the box 20 may include a first part 201 and a second part 202, and the first part 201 and the second part 202 cover each other to define a space for accommodating the battery cell 10. The first part 201 and the second part 202 may be of various shapes, such as cuboid or cylindrical. The first part 201 may be a hollow structure with one side open, the second part 202 may also be a hollow structure with one side open, and the open side of the second part 202 covers the open side of the first part 201 to form the box 20. Alternatively, the first part 201 may be a hollow structure with one side open, the second part 202 may be a plate-like structure, and the second part 202 covers the open side of the first part 201 to form the box 20.

In the battery 100, there may be one or a plurality of battery cells 10. If there are a plurality of battery cells 10, the plurality of battery cells 10 may be connected in series, in parallel, or in series-parallel, where the series-parallel connection refers to a combination of a series connection and a parallel connection of the plurality of battery cells 10. Alternatively, a plurality of battery cells 10 may first be connected in series, in parallel, or in series-parallel to form a battery module, and then a plurality of battery modules are connected in series, in parallel, or in series-parallel to form entirety that is accommodated in the box 20. Alternatively, all battery cells 10 may be directly connected in series, in parallel, or in series-parallel, and then the entirety formed by all the battery cells 10 is accommodated in the box 20.

In some embodiments, the battery 100 may further include a busbar, and a plurality of battery cells 10 may be electrically connected through the busbar to achieve series, parallel, or series-parallel connection of the plurality of battery cells 10. The busbar may be a conductor made of a metal such as copper, iron, aluminum, stainless steel, or aluminum alloy.

Figure 3:
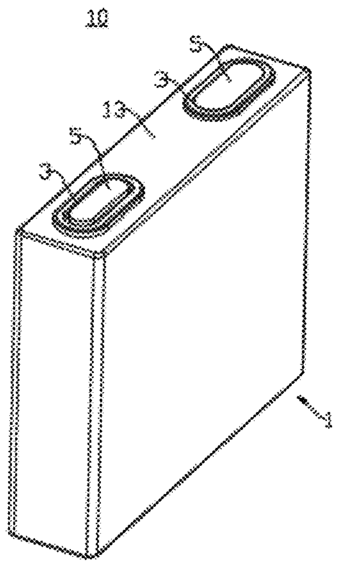
FIG. 3 is an axonometric view of a battery cell according to some embodiments of this application.
Figure 4:
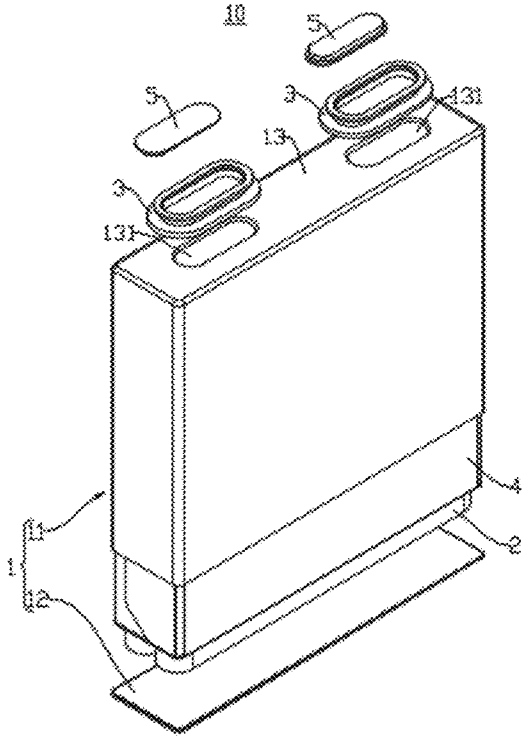
FIG. 4 is an exploded view of the battery cell shown in FIG. 3.

Referring to FIG. 3 and FIG. 4, FIG. 3 is an axonometric view of a battery cell 10 according to some embodiments of this application, and FIG. 4 is an exploded view of the battery cell 10 shown in FIG. 3. The battery cell 10 may include a housing 1, an electrode assembly 2, and an electrode terminal 3, the electrode assembly 2 is accommodated in the housing 1, the electrode terminal 3 is disposed on the housing 1, and the electrode terminal 3 is electrically connected to the electrode assembly 2.

The housing 1 is a component for accommodating the electrode assembly 2, the electrolyte, and other components. In an example, the housing 1 may include a shell 11 and an end cover 12.

The shell 11 may be a hollow structure with an opening formed at one end, or the shell 11 may be a hollow structure with openings formed at two opposite ends. The shell 11 may be of various shapes, such as cylindrical or prismatic. The shell 11 may be made of various materials, such as copper, iron, aluminum, steel, aluminum alloy, and plastic.

The end cover 12 is a component that seals the opening of the shell 11 to isolate the internal environment of the battery cell 10 from the external environment. The end cover 12 and the shell 11 jointly define an accommodating space for accommodating the electrode assembly 2, the electrolyte, and other components. The end cover 12 and the housing 1 may match each other in shape. For example, if the shell 11 is a cuboid, the end cover 12 is a rectangular plate matching the housing 1; and if the shell 11 is cylindrical, the end cover 12 is a circular plate matching the shell 11. The end cover 12 may also be made of various materials, such as copper, iron, aluminum, steel, aluminum alloy, and plastic, and the material of the end cover 12 may be the same as or different from that of the shell 11.

In an embodiment in which the shell 11 has an opening formed at one end, one end cover 12 may be provided correspondingly. In an embodiment in which the shell 11 has openings formed at two opposite ends, two end covers 12 may be provided correspondingly, the two end covers 12 respectively seal the two openings of the shell 11, and the two end covers 12 and the shell 11 jointly define the accommodating space.

The electrode terminal 3 is a component in the battery cell 10 for inputting or outputting electrical energy. The electrode terminal 3 is disposed on the housing 1, and the electrode terminal 3 is configured to be electrically connected to a tab of the electrode assembly 2. The electrode terminal 3 may be disposed on the shell 11 of the housing 1 or on the end cover 12 of the housing 1.

In an example, as shown in FIG. 3 and FIG. 4, the shell 11 is a hollow structure with an opening formed at one end, the housing 1 includes one end cover 12, and a wall portion of the shell 11 opposite the end cover 12 is provided with two electrode terminals 3, one electrode terminal 3 is electrically connected to a positive tab of the electrode assembly 2, and the other electrode terminal 3 is electrically connected to a negative tab of the electrode assembly 2.

In some embodiments, the battery cell 10 may further include a first insulating member 4, the first insulating member 4 is disposed between the electrode assembly 2 and the shell 11, and the first insulating member 4 is configured to insulate and isolate the electrode assembly 2 from the shell 11. The first insulating member 4 is made of an insulating material, such as plastic and rubber. In an example, the first insulating member 4 is an insulating film wrapping around the electrode assembly 2.

Figure 5:
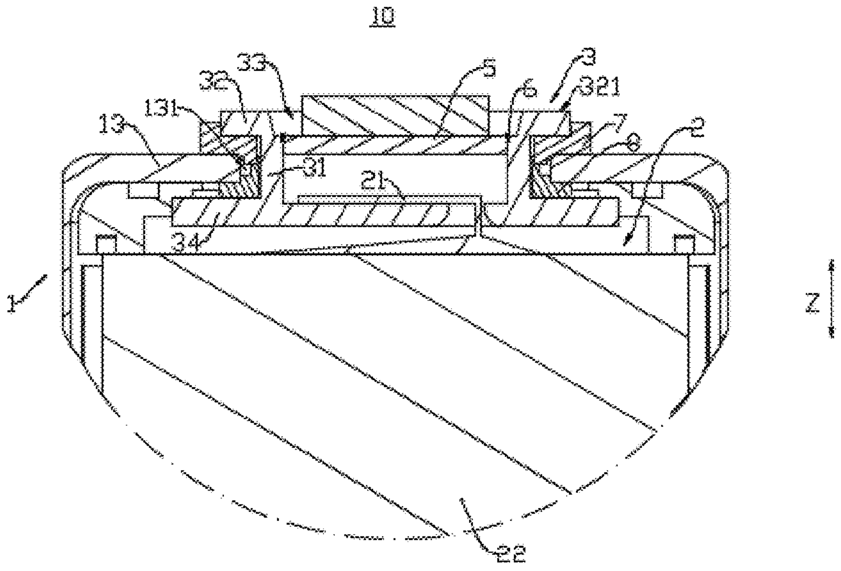
FIG. 5 is a partial cross-sectional view of a battery cell according to some embodiments of this application.
Figure 6:
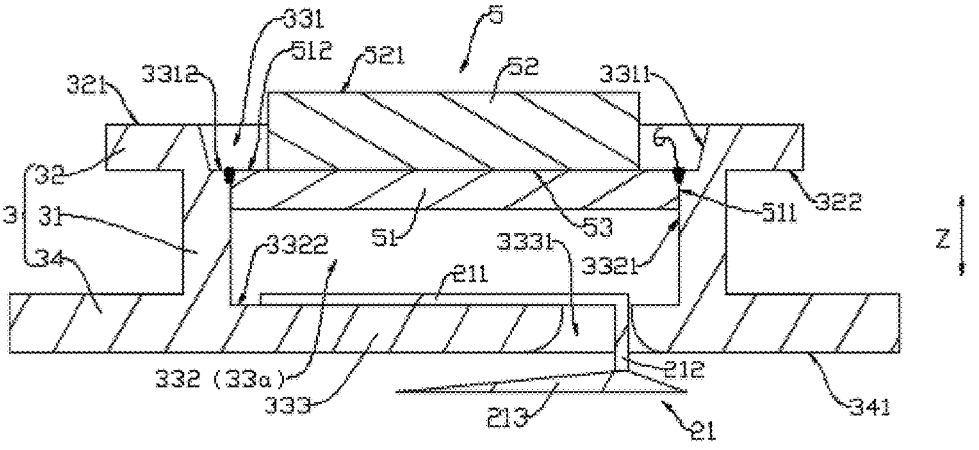
FIG. 6 is an assembly diagram of an electrode terminal and a first connector shown in FIG. 5.
Figure 7:
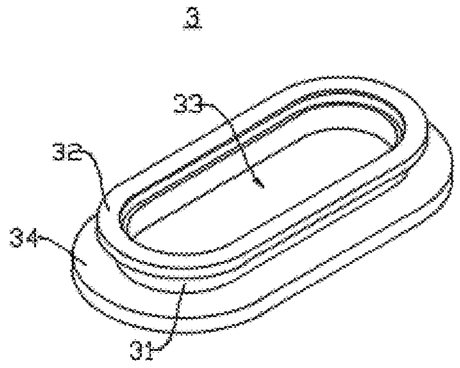
FIG. 7 is an axonometric view of the electrode terminal shown in FIG. 6.
Figure 8:
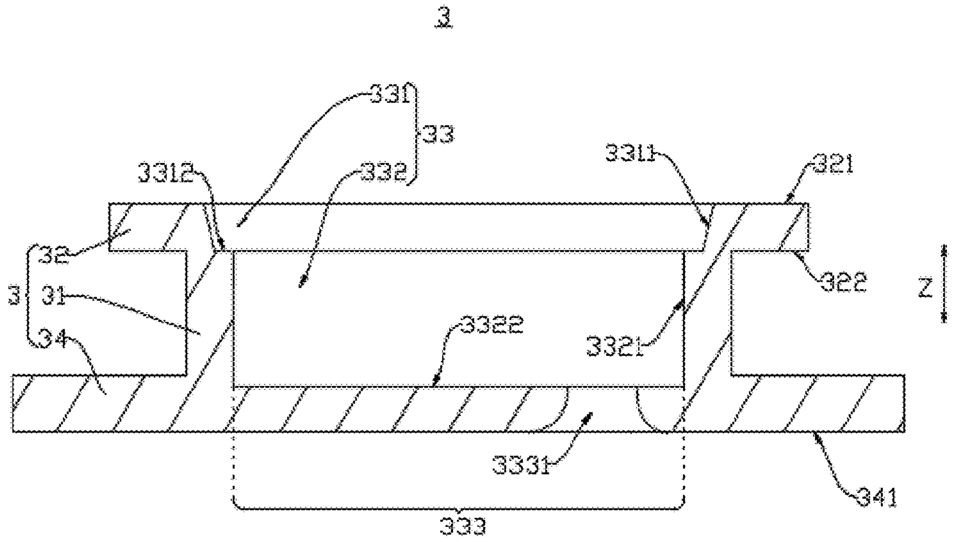
FIG. 8 is a schematic structural diagram of the electrode terminal shown in FIG. 7.

Referring to FIG. 5 to FIG. 8, FIG. 5 is a partial cross-sectional view of a battery cell 10 according to some embodiments of this application; FIG. 6 is an assembly diagram of an electrode terminal 3 and a first connector 5 shown in FIG. 5; FIG. 7 is an axonometric view of an electrode terminal 3 shown in FIG. 6; and FIG. 8 is a schematic structural diagram of the electrode terminal 3 shown in FIG. 7. An embodiment of this application provides a battery cell 10, and the battery cell 10 includes a housing 1, an electrode terminal 3, and a first connector 5. The housing 1 includes a first wall portion 13, and the first wall portion 13 is provided with a lead-out hole 131 running through the first wall portion 13. The electrode terminal 3 includes a body portion 31 and a flange portion 32, the body portion 31 is at least partially inserted into the lead-out hole 131, and along a thickness direction Z of the first wall portion 13, the flange portion 32 is connected to one end of the body portion 31, the flange portion 32 is located on one side of the first wall portion 13, and the flange portion 32 has a first end surface 321 facing away from the body portion 31. The electrode terminal 3 is provided with a groove 33, and the groove 33 has a first groove side surface 3311 connected to the first end surface 321. The first connector 5 is welded to the electrode terminal 3 to form a weld mark portion 6, and a portion of the first groove side surface 3311 located in the flange portion 32 does not contact the weld mark portion 6.

The first wall portion 13 may be the end cover 12 in the housing 1, and it can be understood that the electrode terminal 3 is disposed on the end cover 12. The first wall portion 13 may alternatively be at least one wall portion of the shell 11 in the housing 1, and it can be understood that the electrode terminal 3 is disposed on the shell 11. The first wall portion 13 may be a circular wall portion, a polygonal wall portion, or the like. The polygonal wall portion may be a triangular wall portion, a quadrilateral wall portion, a pentagonal wall portion, a hexagonal wall portion, or the like.

The lead-out hole 131 on the first wall portion 13 is used to lead out the electrode terminal 3, thereby facilitating connection of the electrode terminal 3 to an external component, for example, connection of the electrode terminal 3 to a busbar. The lead-out hole 131 may run through the first wall portion 13 along the thickness direction Z of the first wall portion 13, and the lead-out hole 131 may be a rectangular hole, a circular hole, or the like.

The body portion 31 of the electrode terminal 3 is located in the lead-out hole 131. Specifically, the body portion 31 may be partially located in the lead-out hole 131, or the body portion 31 may be entirely located in the lead-out hole 131. The body portion 31 may be columnar, such as cylindrical or prismatic. The flange portion 32 is a portion formed by locally flanging the electrode terminal 3, and the flange portion 32 may alternatively be located on an inner side of the first wall portion 13 or on an outer side of the first wall portion 13.

The electrode terminal 3 may further include a limiting portion 34. Along the thickness direction Z of the first wall portion 13, one end of the body portion 31 is connected to the flange portion 32, the other end of the body portion 31 is connected to the limiting portion 34, the limiting portion 34 and the flange portion 32 are respectively located on two sides of the first wall portion 13, and the limiting portion 34 and the flange portion 32 are configured to cooperatively clamp the first wall portion 13 so as to fix the electrode terminal 3 to the first wall portion 13. The limiting portion 34 and the flange portion 32 may be in direct contact, or an intermediate member may be provided between the limiting portion 34 and the first wall portion 13 and between the flange portion 32 and the first wall portion 13, so that the limiting portion 34 and the flange portion 32 cooperatively clamp the first wall portion 13. If the flange portion 32 is located on the inner side of the first wall portion 13, the limiting portion 34 is located on the outer side of the first wall portion 13, and the first connector 5 may be configured to be connected to an external component to achieve electrical connection between the external component and the electrode terminal 3; and if the flange portion 32 is located on the outer side of the first wall portion 13, the limiting portion 34 is located on the inner side of the first wall portion 13, and the first connector 5 may be an adapting member for connecting the electrode assembly 2 and the electrode terminal 3 to achieve electrical connection between the electrode assembly 2 and the electrode terminal 3.

The electrode terminal 3 may be a T-shaped structure before being installed on the first wall portion 13, and the electrode terminal 3 includes two parts, which are respectively the limiting portion 34 and a column. During installation, after the column is inserted into the lead-out hole 131 of the first wall portion 13, the column may be flanged and riveted to form the flange portion 32 and the body portion 31 correspondingly.

The first end surface 321 is an end surface of the flange portion 32 at an end facing away from the body portion 31. Along the thickness direction Z of the wall portion, the flange portion 32 further has a second end surface 322, the second end surface 322 is disposed opposite the first end surface 321, and the body portion 31 protrudes from the second end surface 322. The first end surface 321 and the second end surface 322 may be parallel or not parallel to each other, for example, the first end surface 321 and the second end surface 322 are arranged at an acute angle. In an example, the first end surface 321 and the second end surface 322 are planes, and the first end surface 321 is parallel to the second end surface 322.

The groove 33 is recessed from the first end surface 321 toward the interior of the electrode terminal 3, and an opening of the groove 33 is located at the first end surface 321. The groove 33 may be a circular groove, a rectangular groove, or the like. A cross section of the circular groove is circular. A cross section of the rectangular groove is rectangular, meaning the cross section is perpendicular to a depth direction of the groove 33. The depth direction of the groove 33 may be parallel to the thickness direction Z of the first wall portion 13. The groove 33 may be a groove with a continuously extending groove side surface. In this case, the groove side surface of the groove 33 extends continuously from the first end surface 321 to a groove bottom surface of the groove 33, for example, an internal space of the groove 33 is cylindrical, the groove side surface of the groove 33 is cylindrical, one end of the groove 33 is connected to the first end surface 321, and the other end is connected to the groove bottom surface of the groove 33. The groove bottom surface of the groove 33 is a surface at the deepest position of the groove 33. The groove 33 may alternatively be a groove with a non-continuously extending groove side surface, where the groove side surface of the groove 33 includes a plurality of segments of groove side surfaces, the plurality of segments of groove side surfaces are arranged along the depth direction of the groove 33, and the groove 33 may be a stepped groove.

The first groove side surface 3311 is a closed structure extending along a circumferential direction of the opening of the groove 33, and the first groove side surface 3311 may be cylindrical, prismatic, or the like. The first groove side surface 3311 is a portion of the groove side surface of the groove 33 connected to the first end surface 321, the first groove side surface 3311 is connected to the first end surface 321, and the first groove side surface 3311 may be the entire groove side surface of the groove 33 or a part of the groove side surface of the groove 33. In an embodiment in which the groove 33 is a groove with a continuously extending groove side surface, the first groove side surface 3311 is the groove side surface of the groove 33. For another example, if the groove 33 is a stepped groove with a non-continuously extending groove side surface, the first groove side surface 3311 is the groove side surface of the groove at the level closest to the first end surface 321 in the stepped groove.

The first groove side surface 3311 may be entirely located in the flange portion 32; and the first groove side surface 3311 may alternatively be partially located in the flange portion 32. For example, a part of the first groove side surface 3311 is located in the flange portion 32, and another part is located in the body portion 31. Along the thickness direction Z of the first wall portion 13, if an end of the first groove side surface 3311 away from the first end surface 321 is flush with the second end surface 322, or the end of the first groove side surface 3311 away from the first end surface 321 is closer to the first end surface 321 than the second end surface 322, the first groove side surface 3311 is entirely located in the flange portion 32. Along the thickness direction Z of the first wall portion 13, if the end of the first groove side surface 3311 away from the first end surface 321 is farther from the first end surface 321 than the second end surface 322, the first groove side surface 3311 is partially located in the flange portion 32. The portion of the first groove side surface 3311 located in the flange portion 32 is the portion of the first groove side surface 3311 located between the first end surface 321 and the second end surface 322 along the thickness direction Z of the first wall portion 13.

The weld mark portion 6 is a weld mark part formed by welding the first connector 5 to the electrode terminal 3, and specifically, a part of the first connector 5 and a part of the electrode terminal 3 are melted together to form the weld mark portion 6. The portion of the first groove side surface 3311 located in the flange portion 32 does not contact the weld mark portion 6, and the weld mark portion 6 is not connected to or passes through the portion of the first groove side surface 3311 located in the flange portion 32.

In these embodiments of this application, the portion of the first groove side surface 3311 located in the flange portion 32 does not contact the weld mark portion 6, and the first connector 5 is not welded to the portion, whose dimensional accuracy is difficult to control, of the first groove side surface 3311 located in the flange portion 32, effectively improving the welding quality between the first connector 5 and the electrode terminal 3, enhancing the welding strength between the first connector 5 and the electrode terminal 3, and thus improving the reliability of the battery cell 10.

In some embodiments, the groove 33 has a second groove side surface 3321, and along the thickness direction Z of the first wall portion 13, the second groove side surface 3321 is located on a side of the first groove side surface 3311 facing away from the first end surface 321. The first connector 5 includes a first connecting portion 51, the first connecting portion 51 is at least partially accommodated in the groove 33, the first connecting portion 51 has a first outer circumferential surface 511, and the first outer circumferential surface 511 is welded to the second groove side surface 3321 to form the weld mark portion 6.

The second groove side surface 3321 is a closed structure extending along the circumferential direction of the opening of the groove 33, and the second groove side surface 3321 may be cylindrical, prismatic, or the like. In these embodiments, the groove 33 may be a stepped groove, the stepped groove includes a plurality of levels of grooves arranged along the thickness direction Z of the first wall portion 13, and the second groove side surface 3321 and the first groove side surface 3311 may respectively be the groove side surfaces of two levels of grooves in the stepped groove. Specifically, two levels of grooves may be disposed adjacent to each other, or one or a plurality of levels of grooves may be disposed between these two levels of grooves. If the second groove side surface 3321 and the first groove side surface 3311 are respectively the groove side surfaces of two adjacent levels of grooves, the second groove side surface 3321 and the first groove side surface 3311 may be directly connected, and a connection position of the second groove side surface 3321 and the first groove side surface 3311 forms an intersection line, for example, the first groove side surface 3311 is conical, the second groove side surface 3321 is cylindrical, a large end of the first groove side surface 3311 is connected to the first end surface 321, a small end of the first groove side surface 3311 is connected to the second groove side surface 3321, and a diameter of the small end of the first groove side surface 3311 is equal to a diameter of the second groove side surface 3321. The second groove side surface 3321 and the first groove side surface 3311 may alternatively be indirectly connected, for example, the second groove side surface 3321 is connected to the first groove side surface 3311 through a step surface.

The first connecting portion 51 is a portion of the first connector 5, which is to be welded to the electrode terminal 3. The first connecting portion 51 may be entirely located in the groove 33 or only partially located in the groove 33. The material of the first connecting portion 51 may be copper, iron, aluminum, steel, aluminum alloy, or the like.

The first outer circumferential surface 511 is a closed structure extending along a circumferential direction of the first connecting portion 51, and the first outer circumferential surface 511 may be cylindrical, prismatic, or the like. The first outer circumferential surface 511 faces the second groove side surface 3321, the first outer circumferential surface 511 and the second groove side surface 3321 may be in contact, and the first outer circumferential surface 511 and the second groove side surface 3321 may be in an interference fit, a transition fit, or a clearance fit. The first outer circumferential surface 511 is welded to the second groove side surface 3321 to form the weld mark portion 6, and the weld mark portion 6 connects the first outer circumferential surface 511 and the second groove side surface 3321. The weld mark portion 6 may be an annular structure extending along the circumferential direction of the first connecting portion 51, or a multi-segment structure arranged at intervals along the circumferential direction of the first connecting portion 51.

While the first connector 5 is welded to the electrode terminal 3, a fillet weld may be used along a weld seam formed between the first outer circumferential surface 511 and the second groove side surface 3321 to achieve welding of the first outer circumferential surface 511 to the second groove side surface 3321.

In these embodiments, welding the first outer circumferential surface 511 to the second groove side surface 3321 enables no contact between the weld mark portion 6 and the portion of the first groove side surface 3311 located in the flange portion 32. Since the second groove side surface 3321 is located on the side of the first groove side surface 3311 facing away from the first end surface 321, the flange portion 32 is unlikely to affect the second groove side surface 3321 during the forming process, and the dimensional accuracy of the second groove side surface 3321 is easily controlled, thereby improving the fitting accuracy between the second groove side surface 3321 and the first outer circumferential surface 511, achieving high-quality welding between the second groove side surface 3321 and the first outer circumferential surface 511, and improving the welding quality between the first connector 5 and the electrode terminal 3.

In some embodiments, the groove 33 includes a first groove 331 and a second groove 332. The first groove 331 is provided on the first end surface 321, and a groove side surface of the first groove 331 is the first groove side surface 3311. The second groove 332 is provided on a groove bottom surface (first groove bottom surface 3312) of the first groove 331, the first connecting portion 51 is at least partially located in the second groove 332, and a groove side surface of the second groove 332 is the second groove side surface 3321.

It can be understood that, in these embodiments, the groove 33 is a stepped groove, the first groove 331 and the second groove 332 are respectively two adjacent levels of grooves, a groove bottom surface (second groove bottom surface 3322) of the second groove 332 is farther from the first end surface 321 than the groove bottom surface (first groove bottom surface 3312) of the first groove 331, the first groove side surface 3311 and the second groove side surface 3321 are connected through the groove bottom surface (first groove bottom surface 3312) of the first groove 331, achieving connection of the first groove side surface 3311 and the second groove side surface 3321 through a step surface. The first groove bottom surface 3312 is connected to the first groove side surface 3311, and the second groove bottom surface 3322 is connected to the second groove side surface 3321.

In these embodiments, the first connecting portion 51 may be entirely located in the second groove 332 or partially located in the second groove 332.

In these embodiments, the groove 33 has a simple structure, reducing the difficulty of forming the groove 33. Additionally, the first connecting portion 51 is at least partially located in the second groove 332, and the first outer circumferential surface 511 is welded to the second groove side surface 3321 to seal the second groove 332.

In some embodiments, the first connecting portion 51 has a first surface 512 facing away from a groove bottom surface (second groove bottom surface 3322) of the second groove 332, and the first surface 512 is connected to the first outer circumferential surface 511. The first surface 512 is flush with the groove bottom surface (first groove bottom surface 3312) of the first groove 331; or, the first surface 512 is farther from the groove bottom surface (second groove bottom surface 3322) of the second groove 332 than the groove bottom surface (first groove bottom surface 3312) of the first groove 331.

As shown in FIG. 5 and FIG. 6, in an embodiment in which the first surface 512 is flush with the first groove bottom surface 3312 (first groove bottom surface 3312), the first surface 512 and the first groove bottom surface 3312 (first groove bottom surface 3312) may be located in the same plane, and the first connecting portion 51 is entirely located in the second groove 332.

In an embodiment in which the first surface 512 is farther from the groove bottom surface (second groove bottom surface 3322) of the second groove 332 than the groove bottom surface (first groove bottom surface 3312) of the first groove 331, a part of the first connecting portion 51 may be located in the second groove 332, and another part of the first connecting portion 51 may be located in the first groove 331.

In these embodiments, the first surface 512 may be flush with the groove bottom surface (first groove bottom surface 3312) of the first groove 331, or the first surface 512 may be farther from the first end surface 321 than the groove bottom surface (second groove bottom surface 3322) of the first groove 331, so that the first connecting portion 51 is closer to the opening of the groove 33, preventing the first connecting portion 51 from being located too deep in the second groove 332, thereby facilitating the welding of the first outer circumferential surface 511 of the first connecting portion 51 to the second groove side surface 3321.

In some embodiments, still referring to FIG. 5 to FIG. 8, the first connector 5 may further include a second connecting portion 52, the second connecting portion 52 is made of a different material from the first connecting portion 51, and the second connecting portion 52 is composited on the first surface 512.

The second connecting portion 52 is a portion of the first connector 5 configured to be connected to another component. In an embodiment in which the flange portion 32 is located on the outer side of the first wall portion 13, the second connecting portion 52 is configured to be connected to an external component, for example, the external component is a busbar for achieving electrical connection of a plurality of battery cells 10; and in an embodiment in which the flange portion 32 is located on the inner side of the first wall portion 13, the second connecting portion 52 is configured to be connected to an internal component, for example, the internal component is the electrode assembly 2 located inside the housing 1. The material of the first connecting portion 51 may be the same as the material of the electrode terminal 3, the material of the second connecting portion 52 is different from the material of the first connecting portion 51, and the material of the second connecting portion 52 may be copper, iron, aluminum, steel, aluminum alloy, or the like. In an example, in FIG. 5 to FIG. 8, the flange portion 32 is located on the outer side of the first wall portion 13, the second connecting portion 52 is configured to be connected to an external component, the material of the second connecting portion 52 may be the same as the material of the external component, the material of the first connecting portion 51 is copper, and the material of the second connecting portion 52 is aluminum.

The second connecting portion 52 and the first connecting portion 51 may be composited through friction welding, so that the second connecting portion 52 is composited on the first surface 512, and thus the second connecting portion 52 is fixed to the first surface 512. A surface of the second connecting portion 52 connected to the first connecting portion 51 is a composite interface 53 formed by compositing of the first connecting portion 51 and the second connecting portion 52.

In these embodiments, the second connecting portion 52 may be configured to be connected to another component, enabling electrical connection between the electrode terminal 3 and the another component made of a different material. Additionally, since the second connecting portion 52 is composited on the first surface 512 of the first connecting portion 51, the second connecting portion 52 is located on the outer side of the second groove 332, facilitating connection of the second connecting portion 52 to the another component.

In some embodiments, along the thickness direction Z of the first wall portion 13, the flange portion 32 is located on a side of the first wall portion 13 facing away from the interior of the housing 1, and the first connector 5 has a second surface 521 farthest from the groove bottom surface (second groove bottom surface 3322) of the second groove 332. The second surface 521 is flush with the first end surface 321; or, the second surface 521 is farther from the groove bottom surface (second groove bottom surface 3322) of the second groove 332 than the first end surface 321.

It can be understood that the flange portion 32 is located on the outer side of the first wall portion 13. The second surface 521 is an end surface of the first connector 5 at one end along the thickness direction Z of the first wall portion 13. In an embodiment in which the second connecting portion 52 is composited on the first surface 512 of the first connecting portion 51, along the thickness direction Z of the first wall portion 13, the second surface 521 may be an end surface of the second connecting portion 52 facing away from the first surface 512.

In an embodiment in which the second surface 521 is flush with the first end surface 321, the second surface 521 and the first end surface 321 may be located in the same plane, and the first connecting portion 51 and the second connecting portion 52 are both entirely located in the groove 33. As shown in FIG. 5 and FIG. 6, in an embodiment where the second surface 521 is farther from the groove bottom surface (second groove bottom surface 3322) of the second groove 332 than the first end surface 321, the second connecting portion 52 partially protrudes from the first end surface 321, so that the second connecting portion 52 is partially located outside the groove 33.

Since the flange portion 32 is located on the side of the first wall portion 13 facing away from the interior of the housing 1, the first connector 5 may be configured to be connected to an external component. Since the second surface 521 is flush with the first end surface 321, or the second surface 521 is farther from the groove bottom surface of the second groove 332 than the first end surface 321, the second surface 521 can contact the external component while the second connecting portion 52 is connected to the external component, enhancing the connection strength between the second connecting portion 52 and the external component. For example, while the second connecting portion 52 is welded to an external component, since the second surface 521 contacts the external component, the gap between the second connecting portion 52 and the external component is eliminated, so that the second connecting portion 52 is welded to the external component more firmly, enhancing the connection strength between the second connecting portion 52 and the external component.

In some embodiments, still referring to FIG. 5 and FIG. 6, the first outer circumferential surface 511 and the second groove side surface 3321 are both parallel to the thickness direction Z of the first wall portion 13.

In an embodiment in which the first outer circumferential surface 511 and the second groove side surface 3321 are both cylindrical, it can be understood that centerlines of the first outer circumferential surface 511 and the second groove side surface 3321 are both parallel to the thickness direction Z; and in an embodiment in which the first outer circumferential surface 511 and the second groove side surface 3321 are both prismatic, the first outer circumferential surface 511 and the second groove side surface 3321 each include a plurality of side surfaces sequentially connected end-to-end along the circumferential direction of the first connecting portion 51, and each side surface is parallel to the thickness direction Z of the first wall portion 13.

In these embodiments, the first outer circumferential surface 511 and the second groove side surface 3321 both extend along the thickness direction Z, the forming difficulty of the first outer circumferential surface 511 and the second groove side surface 3321 is lower, making it easier to control the fitting accuracy of the first outer circumferential surface 511 and the second groove side surface 3321 at a high level.

Figure 9:
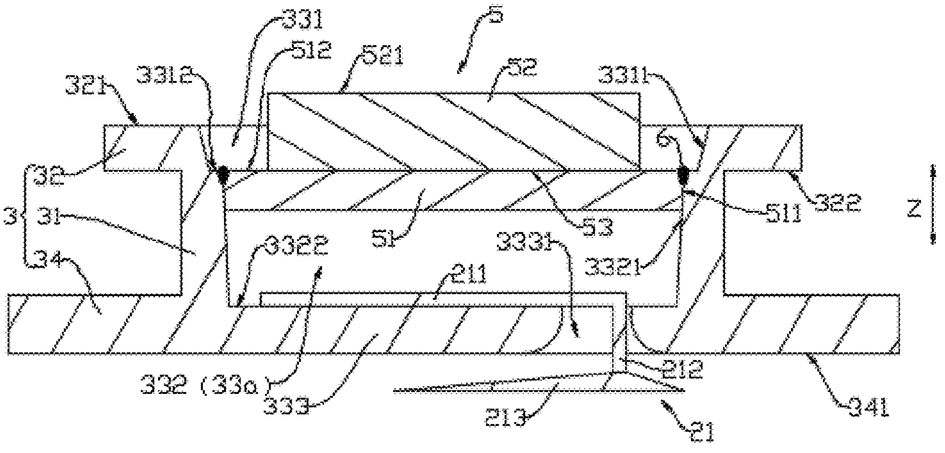
FIG. 9 is an assembly diagram of an electrode terminal and a first connector according to some other embodiments of this application.

In some embodiments, referring to FIG. 9, FIG. 9 is an assembly diagram of an electrode terminal 3 and a first connector 5 according to some other embodiments of this application. The first outer circumferential surface 511 and the second groove side surface 3321 are conical surfaces that fit with each other.

The first outer circumferential surface 511 and the second groove side surface 3321 may be conical surfaces, pyramidal surfaces, or the like. The pyramidal surface may include a plurality of inclined surfaces sequentially connected end-to-end along the circumferential direction of the first connecting portion 51, where only some of the plurality of inclined surfaces may be inclined planes, or all may be inclined planes.

In these embodiments, the first outer circumferential surface 511 and the second groove side surface 3321 are conical surfaces that fit with each other, thereby limiting the first connecting portion 51 along the thickness direction Z, reducing the difficulty of welding the first connector 5 to the electrode terminal 3, and improving the welding efficiency between the first connector 5 and the electrode terminal 3.

Figure 10:
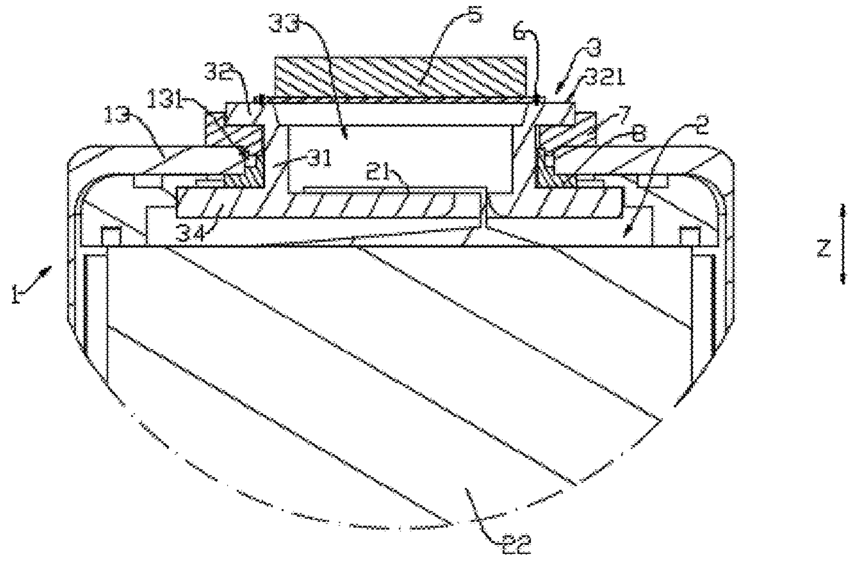
FIG. 10 is a partial cross-sectional view of a battery cell according to still some other embodiments of this application.
Figure 11:
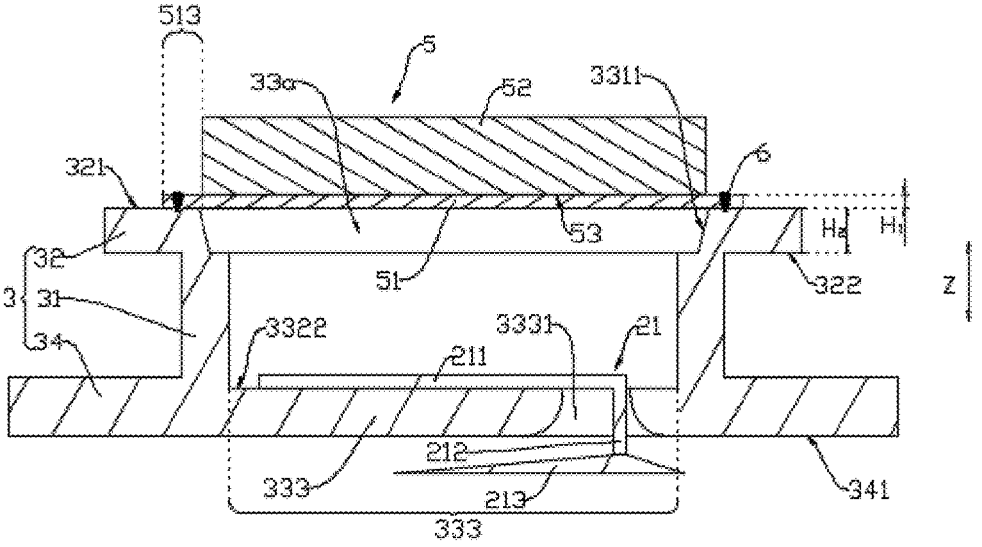
FIG. 11 is an assembly diagram of the electrode terminal and the first connector shown in FIG. 10.

In some embodiments, referring to FIG. 10 and FIG. 11, FIG. 10 is a partial cross-sectional view of a battery cell 10 according to still some other embodiments of this application; and FIG. 11 is an assembly diagram of an electrode terminal 3 and a first connector 5 shown in FIG. 10. The first connector 5 covers the groove 33, and the first connector 5 is welded to the first end surface 321 to form the weld mark portion 6.

The first connector 5 covering the groove 33 means that the first connector 5 covers the entire opening of the groove 33.

In an example, the first connector 5 is entirely located outside the groove 33. During welding, the first connector 5 may be placed on the first end surface 321 and the first connector 5 is welded to the first end surface 321 through penetration welding.

It should be noted that, in these embodiments, the flange portion 32 may be located on the outer side of the first wall portion 13, or the flange portion 32 may be located on the inner side of the first wall portion 13.

In these embodiments, welding the first connector 5 to the first end surface 321 enables no contact between the weld mark portion 6 and the portion of the first groove side surface 3311 located in the flange portion 32. The flange portion 32 is unlikely to affect the first end surface 321 during the forming process, achieving high-quality welding between the first connector 5 and the first end surface 321, and improving the welding quality between the first connector 5 and the electrode terminal 3. Additionally, this structure allows the first connector 5 to be located outside the groove 33, facilitating connection of the first connector 5 to another component to achieve electrical connection between the electrode terminal 3 and the another component.

In some embodiments, the first connector 5 includes a first connecting portion 51 welded to the first end surface 321, a thickness of the first connecting portion 51 is $H_1$, a thickness of the flange portion 32 is $H_2$, and $H_1/H_2 \leq 0.9$.

In these embodiments, the first connecting portion 51 is a portion of the first connector 5 configured to be welded to the electrode terminal 3, and the first connecting portion 51 may be a plate-like structure in contact with the first end surface 321, with the first connector 5 covering the groove 33.

The thickness of the first connecting portion 51 is the minimum dimension of the first connector 5 along the thickness direction Z of the first wall portion 13. The thickness of the flange portion 32 is the minimum dimension of the flange portion 32 along the thickness direction Z of the first wall portion 13, which is also the minimum distance between the first end surface 321 and the second end surface 322 of the flange portion 32. The thickness of the first connecting portion 51 and the thickness of the flange portion 32 can both be measured using a vernier caliper. By measuring the thickness of the thinnest part of the first connecting portion 51 with a vernier caliper, the thickness of the first connecting portion 51 is obtained. By measuring the thickness of the thinnest part of the flange portion 32 with a vernier caliper, the thickness of the flange portion 32 is obtained.

$H_1/H_2$ may be any point value among 0.1, 0.2, 0.3, 0.4, 0.5, 0.6, 0.7, 0.8, and 0.9, or a value within a range between any two of these values.

Optionally, $H_1/H_2 \leq 0.5$.

In these embodiments, $H_1/H_2 \leq 0.9$ ensures that the thickness of the first connecting portion 51 is not excessively large, allowing welding heat to be easily transferred from the first connecting portion 51 to the flange portion 32 while the first connecting portion 51 is welded to the flange portion 32 through penetration welding, improving the welding quality between the first connecting portion 51 and the flange portion 32.

In some embodiments, still referring to FIG. 10 and FIG. 11, the first connector 5 may further include a second connecting portion 52, the second connecting portion 52 is made of a different material from the first connecting portion 51, and along the thickness direction Z, the second connecting portion 52 is located on a side of the first connecting portion 51 facing away from the first end surface 321, and the second connecting portion 52 and the first connecting portion 51 are composited.

The second connecting portion 52 is a portion of the first connector 5 configured to be connected to another component. In an embodiment in which the flange portion 32 is located on the outer side of the first wall portion 13, the second connecting portion 52 is configured to be connected to an external component, for example, the external component is a busbar for achieving electrical connection of a plurality of battery cells 10; and in an embodiment in which the flange portion 32 is located on the inner side of the first wall portion 13, the second connecting portion 52 is configured to be connected to an internal component, for example, the internal component is the electrode assembly 2 located inside the housing 1. The material of the first connecting portion 51 may be the same as the material of the electrode terminal 3, the material of the second connecting portion 52 is different from the material of the first connecting portion 51, and the material of the second connecting portion 52 may be copper, iron, aluminum, steel, aluminum alloy, or the like. In an example, in FIG. 10 and FIG. 11, the flange portion 32 is located on the outer side of the first wall portion 13, the second connecting portion 52 is configured to be connected to an external component, the material of the second connecting portion 52 may be the same as the material of the external component, the material of the first connecting portion 51 is copper, and the material of the second connecting portion 52 is aluminum.

The second connecting portion 52 and the first connecting portion 51 may be composited through friction welding, so that the second connecting portion 52 and the first connecting portion 51 are fixed, and a surface of the second connecting portion 52 connected to the first connecting portion 51 is a composite interface 53 formed by compositing of the first connecting portion 51 and the second connecting portion 52.

In these embodiments, the second connecting portion 52 may be configured to be connected to another component, enabling electrical connection between the electrode terminal 3 and the another component made of a different material. Additionally, since the second connecting portion 52 is located on a side of the first connecting portion 51 facing away from the first surface 512, the second connecting portion 52 is located on the outer side of the groove 33, facilitating connection of the second connecting portion 52 to the another component.

In some embodiments, the first connecting portion 51 includes a first connection region 513, orthographic projections of the first connection region 513 and the second connecting portion 52 along the thickness direction Z do not overlap, and the first connection region 513 is welded to the first end surface 321 to form the weld mark portion 6.

The first connection region 513 is a portion of the first connecting portion 51 not covered by the second connecting portion 52. In an example, an orthographic projection of the weld mark portion 6 along the thickness direction Z of the first wall portion 13 is located in the first connection region 513.

In these embodiments, the orthographic projections of the first connection region 513 and the second connecting portion 52 along the thickness direction Z do not overlap, so the second connecting portion 52 is less likely to cause interference to the welding of the first connecting portion 51 to the electrode terminal 3, making it easier to weld the first connecting portion 51 to the first end surface 321.

In some embodiments, still referring to FIG. 5 and FIG. 10, the flange portion 32 is located on a side of the first wall portion 13 facing away from the interior of the housing 1.

It can be understood that the flange portion 32 is located on the outer side of the first wall portion 13, and the limiting portion 34 is located on the inner side of the first wall portion 13.

In an example, the battery cell 10 may further include a second insulating member 7, the second insulating member 7 sleeves the outer side of the body portion 31, and the second insulating member 7 is at least partially located between the flange portion 32 and the first wall portion 13 to insulate and isolate the flange portion 32 from the first wall portion 13. The second insulating member 7 may be partially located in the lead-out hole 131 to insulate and isolate the body portion 31 from the first wall portion 13.

In an example, the battery cell 10 may further include a sealing member 8, the sealing member 8 sleeves the outer side of the body portion 31, and the sealing member 8 is at least partially located between the limiting portion 34 and the first wall portion 13 to achieve sealing between the electrode terminal 3 and the first wall portion 13. Optionally, a part of the sealing member 8 is located between the limiting portion 34 and the first wall portion 13, and another part of the sealing member 8 is located in the lead-out hole 131 to improve the airtightness between the electrode terminal 3 and the first wall portion 13.

In these embodiments, the flange portion 32 is located on the outer side of the first wall portion 13, and when the electrode terminal 3 is flanged, the electrode terminal 3 can be flanged outside the housing 1 to form the flange portion 32, effectively reducing the difficulty of forming the flange portion 32.

In some embodiments, still referring to FIG. 5, FIG. 6, and FIG. 9 to FIG. 11, the battery cell 10 further includes an electrode assembly 2, the electrode assembly 2 is accommodated in the housing 1, the electrode assembly 2 includes a first tab 21, and the first tab 21 is electrically connected to the electrode terminal 3. A groove bottom wall 333 of the groove is provided with a first through hole 3331, the first through hole 3331 enables communication between the groove 33 and the interior of the housing 1, and the first tab 21 is inserted into the first through hole 3331 and a part of the first tab 21 is accommodated in the groove 33.

The first tab 21 may be a negative tab or a positive tab. The electrode assembly 2 may further include an active material coating portion 22, and the first tab 21 protrudes from one end of the active material coating portion 22. The active material coating portion 22 may be a portion of the electrode assembly 2 corresponding to a region of an electrode plate coated with an active material layer. If the first tab 21 is a positive tab, the first tab 21 may be a portion of the positive electrode plate not coated with the active material layer. If the first tab 21 is a negative tab, the first tab 21 may be a portion of the negative electrode plate not coated with the active material layer. In the embodiments shown in FIG. 5, FIG. 6, FIG. 9, FIG. 10, and FIG. 11, the first tab 21 is a negative tab.

The groove bottom wall 333 of the groove is a residual portion of a region of the electrode terminal 3 corresponding to the groove 33. In an embodiment in which the groove 33 includes a first groove 331 and a second groove 332, the groove bottom wall 333 of the groove is the groove bottom wall of the second groove 332. Along the thickness direction Z of the first wall portion 13, the limiting portion 34 has a third end surface 341 facing away from the limiting portion 34, and a portion of the electrode terminal 3 located between the groove bottom surface (second groove bottom surface 3322) of the second groove 332 and the third end surface 341 is the groove bottom wall 333 of the groove. Two ends of the first through hole 3331 extend to the second groove bottom surface 3322 and the third end surface 341, respectively. In an example, the groove bottom wall 333 of the groove is a part of the limiting portion 34.

The first through hole 3331 may be a circular hole, a polygonal hole, or the like. The polygonal hole may be a triangular hole, a quadrilateral hole, a pentagonal hole, a hexagonal hole, or the like. A hole with a circular cross section is a circular hole, and a hole with a polygonal cross section is a polygonal hole, where the cross section herein is perpendicular to an axial direction of the first through hole 3331.

In these embodiments, since the flange portion 32 is located on the side of the first wall portion 13 facing away from the interior of the housing 1, an opening of the groove 33 formed at the first end surface 321 faces the exterior of the housing 1, and since the first tab 21 passes through the first through hole 3331 and is partially located in the groove 33, it is easy to store and organize the first tab 21 within the groove 33 through the opening of the groove 33 or to implement an electrical connection operation between the first tab 21 and the electrode terminal 3, thereby reducing the production difficulty of the battery cell 10. Additionally, since the first tab 21 is at least partially located in the groove 33, the space occupied by the first tab 21 inside the housing 1 can be reduced, and more space is provided for the active material coating portion 22 of the electrode assembly 2, which is conducive to increasing the volumetric energy density of the battery cell 10.

In some embodiments, the first tab 21 includes a first tab portion 211 located in the groove 33, and the first tab portion 211 is connected to the groove bottom wall 333 of the groove.

The first tab portion 211 is a portion of the first tab 21 located in the groove 33 and connected to the groove bottom wall 333 of the groove. The first tab portion 211 and the groove bottom wall 333 of the groove may be connected in various ways to achieve electrical connection between the first tab 21 and the electrode terminal 3, for example, the first tab portion 211 is welded to the groove bottom wall 333 of the groove, connected using a conductive adhesive, or the like.

The first tab 21 may further include a second tab portion 212 and a tab root 213, the tab root 213 is connected to the active material coating portion 22, and the second tab portion 212 connects the tab root 213 and the first tab portion 211. The tab root 213 is a portion where the root of the first tab 21 is gathered, the second tab portion 212 is at least partially inserted into the first through hole 3331, the first tab portion 211 is bent relative to the second tab portion 212, and the first tab portion 211 and the second tab portion 212 may be perpendicular to each other or arranged at an acute angle or an obtuse angle.

When the first tab 21 and the electrode terminal 3 are electrically connected, the first tab portion 211 located in the groove 33 is connected to the groove bottom wall 333 of the groove more easily and more conveniently, facilitating large-area contact between the first tab 21 and the electrode terminal 3, and increasing a current-carrying area therebetween.

In some embodiments, still referring to FIG. 6, FIG. 9, and FIG. 11, the first connector 5 seals the groove 33 to form an accommodating cavity **33*a* inside the electrode terminal 3, the first connector 5 is configured to isolate the accommodating cavity 33*a* from the exterior of the housing 1, and the accommodating cavity 33*a* is in communication with the interior of the housing 1 through the first through hole 3331**.

The portion of the first tab 21 located in the groove 33 is located in the accommodating cavity **33*a*, so the first tab portion 211 is located in the accommodating cavity 33*a***.

As shown in FIG. 6 and FIG. 9, in an embodiment in which the first outer circumferential surface 511 of the first connecting portion 51 is welded to the second groove side surface 3321 of the second groove 332, the first connector 5 seals the second groove 332 to seal the groove 33, and the accommodating cavity **33*a* may be a part of the second groove 33. As shown in FIG. 11, in an embodiment in which the first connector 5 covers the groove 33 and the first connector 5 is welded to the first end surface 321, the groove 33 sealed by the first connector 5 is the accommodating cavity 33*a***.

It can be understood that the accommodating cavity **33*a* is not in communication with the exterior of the housing 1, and the accommodating cavity 33*a* is in communication with the interior of the housing 1 through the first through hole 3331**.

Since the accommodating cavity **33*a* is in communication with the interior of the housing 1 through the first through hole 3331, the accommodating cavity 33*a* can serve as a buffer and temporary storage structure for the electrolyte, allowing the battery cell 10 to accommodate more electrolyte inside, and since the electrolyte is consumed during the charging and discharging processes of the battery cell 10, providing more electrolyte can extend the service life of the battery cell 10; and the accommodating cavity 33*a* can also serve as an accommodating and buffer structure for gases inside the battery cell 10, reducing the swelling of the battery cell 10, and improving the reliability and stability of the battery cell 10**.

In some embodiments, still referring to FIG. 6, FIG. 9, and FIG. 11, the first connector 5 includes a first connecting portion 51 and a second connecting portion 52. The first connecting portion 51 is welded to the electrode terminal 3 to form the weld mark portion 6, and the first connecting portion 51 seals the groove 33. The second connecting portion 52 is made of a different material from the first connecting portion 51, the second connecting portion 52 and the first connecting portion 51 are composited to form a composite interface 53, and the composite interface 53 is located outside the accommodating cavity **33*a***.

The second connecting portion 52 and the first connecting portion 51 are composited, so that the second connecting portion 52 and the first connecting portion 51 are fixed, and the connection position of the second connecting portion 52 and the first connecting portion 51 forms the composite interface 53.

In these embodiments, since the composite interface 53 formed by compositing of the second connecting portion 52 and the first connecting portion 51 is located outside the accommodating cavity 33*a*, the electrolyte entering the accommodating cavity 33*a* does not contact the composite interface 53, reducing the risk of corrosion of the composite interface 53 due to local formation of a primary cell 100, and reducing the risk of separation of the first connecting portion 51 and the second connecting portion 52 under the corrosion of the electrolyte.

In some embodiments, along the thickness direction Z of the first wall portion 13, the first connecting portion 51 and the second connecting portion 52 are stacked, and the second connecting portion 52 is located on a side of the first connecting portion 51 facing away from the accommodating cavity 33*a*.

In the embodiments shown in FIG. 6, FIG. 9, and FIG. 11, the second connecting portion 52 is composited on a surface of the first connecting portion 51 facing away from the groove bottom surface (second groove bottom surface 3322) of the second groove 332, so that the composite interface 53 is located outside the accommodating cavity 33*a*.

The flange portion 32 is located on the outer side of the first wall portion 13, and the second connecting portion 52 is located on the side of the first connecting portion 51 facing away from the accommodating cavity 33*a*, facilitating connection of the second connecting portion 52 to an external component.

Figure 12:
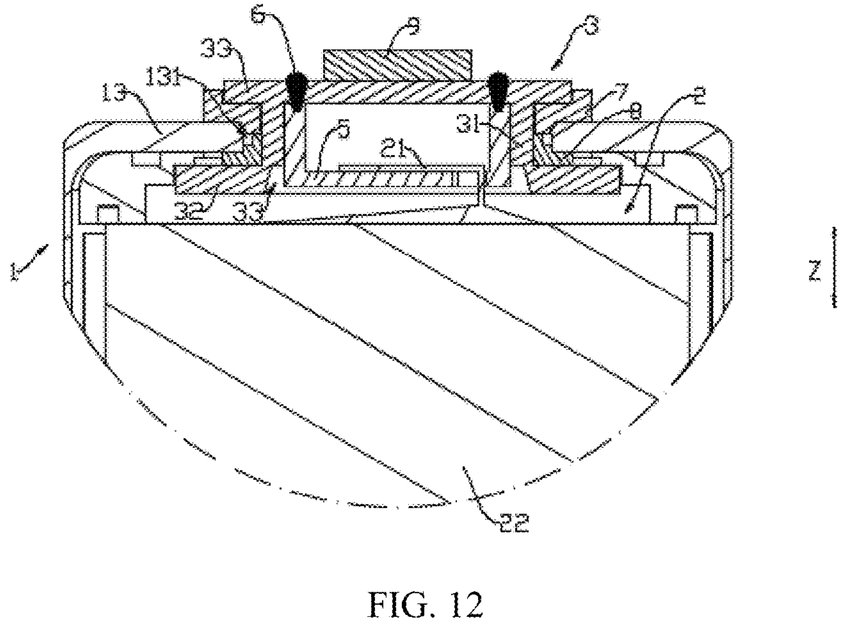
FIG. 12 is a partial cross-sectional view of a battery cell according to another embodiment of this application.
Figure 13:
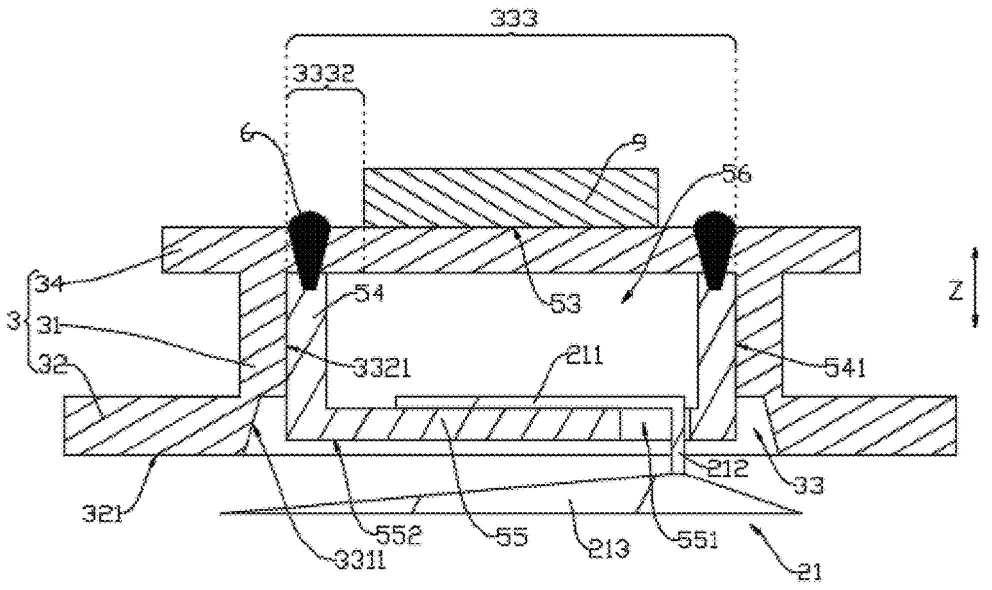
FIG. 13 is an assembly diagram of an electrode terminal, a first connector, and a second connector shown in FIG. 12.
Figure 14:
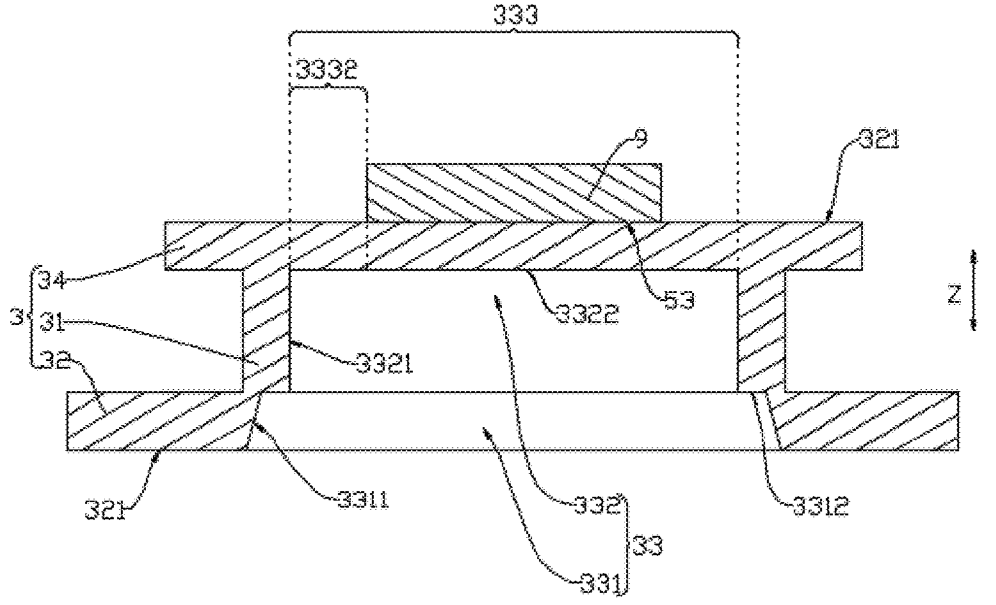
FIG. 14 is an assembly diagram of the electrode terminal and the second connector shown in FIG. 13.

In some embodiments, referring to FIG. 12 to FIG. 14, FIG. 12 is a partial cross-sectional view of a battery cell 10 according to another embodiment of this application; FIG. 13 is an assembly diagram of an electrode terminal 3, a first connector 5, and a second connector 9 shown in FIG. 12; and FIG. 14 is an assembly diagram of the electrode terminal 3 and the second connector 9 shown in FIG. 13. The first connector 5 is at least partially accommodated in the groove 33, and the first connector 5 is welded to the groove bottom wall 333 of the groove to form the weld mark portion 6.

The first connector 5 may be partially accommodated in the groove 33 or entirely accommodated in the groove 33.

In an example, the groove 33 includes a first groove 331 and a second groove 332, the first groove 331 is provided on the first end surface 321, the second groove 332 is provided on the groove bottom surface (first groove bottom surface 3312) of the first groove 331, the groove bottom wall of the second groove 332 is the groove bottom wall 333 of the groove, and the groove bottom wall 333 of the groove may be a part of the limiting portion 34.

During welding, the first connector 5 may first be accommodated in the groove 33, so that the first connector 5 abuts against the groove bottom wall 333 of the groove, and then the groove bottom wall 333 of the groove is welded to the first connector 5 through penetration welding from a side of the groove bottom wall 333 of the groove facing away from the groove 33 to form the weld mark portion 6.

In these embodiments, welding the first connecting portion 51 to the groove bottom wall 333 of the groove enables no contact between the weld mark portion 6 and the portion of the first groove side surface 3311 located in the flange portion 32. The groove bottom wall 333 of the groove is farther from the first groove side surface 3311, and the flange portion 32 is unlikely to affect the groove bottom wall 333 of the groove during the forming process, achieving high-quality welding between the first connector 5 and the groove bottom wall 333 of the groove, improving the welding quality between the first connector 5 and the electrode terminal 3.

In some embodiments, still referring to FIG. 12 and FIG. 13, the flange portion 32 is located on a side of the first wall portion 13 facing the interior of the housing 1.

It can be understood that the flange portion 32 is located on the inner side of the first wall portion 13, and the limiting portion 34 is located on the outer side of the first wall portion 13.

In an example, the battery cell 10 may further include a second insulating member 7, the second insulating member 7 sleeves the outer side of the body portion 31, and the second insulating member 7 is at least partially located between the limiting portion 34 and the first wall portion 13 to insulate and isolate the limiting portion 34 from the first wall portion 13. The second insulating member 7 may be partially located in the lead-out hole 131 to insulate and isolate the body portion 31 from the first wall portion 13.

In an example, the battery cell 10 may further include a sealing member 8, the sealing member 8 sleeves the outer side of the body portion 31, and the sealing member 8 is at least partially located between the flange portion 32 and the first wall portion 13 to achieve sealing between the electrode terminal 3 and the first wall portion 13. Optionally, a part of the sealing member 8 is located between the flange portion 32 and the first wall portion 13, and another part of the sealing member 8 is located in the lead-out hole 131 to improve the airtightness between the electrode terminal 3 and the first wall portion 13.

In these embodiments, the flange portion 32 is located on the inner side of the first wall portion 13, and an opening of the groove 33 formed at the first end surface 321 faces the interior of the housing 1, thus the first connector 5 accommodated in the groove 33 is located inside the housing 1, so that the first connector 5 is hidden. Additionally, since the flange portion 32 is located on the inner side of the first wall portion 13, the flange portion 32 is unlikely to affect the portion of the electrode terminal 3 located on the outer side of the first wall portion 13 during the forming process, which is conducive to enhancing the connection strength between the electrode terminal 3 and external component.

In some embodiments, the battery cell 10 further includes an electrode assembly 2, the electrode assembly 2 is accommodated in the housing 1, and the electrode assembly 2 includes a first tab 21. The first connector 5 connects the first tab 21 and the electrode terminal 3 to achieve electrical connection between the first tab 21 and the electrode terminal 3.

In these embodiments, the first connector 5 is an adapting member for connecting the first tab 21 and the electrode terminal 3. The first tab 21 may be a positive tab or a negative tab. In the embodiments shown in FIG. 12 and FIG. 13, the first tab 21 is a negative tab.

In these embodiments, the first connector 5 is a component for achieving electrical connection between the first tab 21 and the electrode terminal 3, and since the first connector 5 is at least partially accommodated in the groove 33, the space occupied by the first connector 5 inside the housing 1 can be reduced, and more space is provided for the active material coating portion 22 of the electrode assembly 2, which is conducive to increasing the volumetric energy density of the battery cell 10.

In some embodiments, still referring to FIG. 12 and FIG. 13, the first tab 21 is at least partially accommodated in the groove 33.

The first tab 21 may be partially located in the groove 33 or entirely located in the groove 33.

In these embodiments, the groove 33 can provide space to accommodate the first tab 21, reducing the space occupied by the first tab 21 inside the housing 1, and providing more space for the active material coating portion 22 of the electrode assembly 2, which is conducive to increasing the volumetric energy density of the battery cell 10.

In some embodiments, the first connector 5 includes a third connecting portion 54 and a fourth connecting portion 55, the fourth connecting portion 55 is connected to one end of the third connecting portion 54, and an end of the third connecting portion 54 away from the fourth connecting portion 55 is welded to the groove bottom wall 333 of the groove to form the weld mark portion 6. The third connecting portion 54 surrounds the fourth connecting portion 55, the third connecting portion 54 and the fourth connecting portion 55 jointly define an accommodating space 56, the fourth connecting portion 55 is provided with a second through hole 551, the second through hole 551 enables communication between the accommodating space 56 and the interior of the housing 1, and the first tab 21 is inserted into the second through hole 551 and partially accommodated in the accommodating space 56.

The third connecting portion 54 may be an annular structure, and the fourth connecting portion 55 may be a plate-like structure. The fourth connecting portion 55 seals one end of the third connecting portion 54, the accommodating space 56 forms an opening at an end opposite the fourth connecting portion 55, and the groove bottom wall 333 of the groove seals the opening.

Two ends of the second through hole 551 extend to an inner surface and an outer surface of the fourth connecting portion 55, respectively, where the inner surface of the fourth connecting portion 55 faces the accommodating space 56, and the outer surface faces away from the accommodating space 56. The second through hole 551 may be a circular hole, a polygonal hole, or the like.

In these embodiments, the first tab portion 211 is accommodated in the accommodating space 56, reducing the space occupied by the first tab 21 inside the housing 1, and providing more space for the active material coating portion 22 of the electrode assembly 2, which is conducive to increasing the volumetric energy density of the battery cell 10. Additionally, since the accommodating space 56 is in communication with the interior of the housing 1 through the second through hole 551, the accommodating space 56 can serve as a buffer and temporary storage structure for the electrolyte, allowing the battery cell 10 to accommodate more electrolyte inside, thereby extending the service life of the battery cell 10; and the accommodating space 56 can also serve as an accommodating and buffer structure for gases inside the battery cell 10, reducing the swelling of the battery cell 10, and improving the reliability and stability of the battery cell 10.

In some embodiments, the first tab 21 includes a first tab portion 211 located in the accommodating space 56, and the first tab portion 211 is connected to the fourth connecting portion 55.

In these embodiments, the first tab portion 211 is a portion of the first tab 21 located in the accommodating space 56 and connected to the fourth connecting portion 55. The first tab portion 211 and the fourth connecting portion 55 may be connected in various ways to achieve electrical connection between the first tab portion 211 and the fourth connecting portion 55, for example, the first tab portion 211 is connected to the fourth connecting portion 55 through welding, connected using a conductive adhesive, or the like.

The first tab 21 may further include a second tab portion 212 and a tab root 213, the tab root 213 is connected to the active material coating portion 22 of the electrode assembly 2, and the second tab portion 212 connects the tab root 213 and the first tab portion 211. The tab root 213 is a portion where the root of the first tab 21 is gathered, the second tab portion 212 is at least partially inserted into the second through hole 551, the first tab portion 211 is bent relative to the second tab portion 212, and the first tab portion 211 and the second tab portion 212 may be perpendicular to each other or arranged at an acute angle or an obtuse angle. In an example, the first tab portion 211 is located in the accommodating space 56 and in the groove 33, a part of the second tab portion 212 is located in the groove 33, another part of the second tab portion 212 is located outside the groove 33, and the tab root 213 is located outside the groove 33.

During assembly, the first tab portion 211 of the first tab 21 may first be connected to the fourth connecting portion 55 of the first connector 5, for example, through welding, then the first connector 5 is accommodated in the groove 33, and the groove bottom wall 333 of the groove is welded to the third connecting portion 54 of the first connector 5.

In these embodiments, when the first tab 21 and the first connector 5 are electrically connected, the first tab portion 211 located in the accommodating space 56 is connected to the fourth connecting portion 55 more easily and more conveniently, facilitating large-area contact between the first tab 21 and the first connector 5, and increasing a current-carrying area therebetween.

In some embodiments, along the thickness direction Z of the first wall portion 13, the first connector 5 has a third surface 552 farthest from the groove bottom wall 333 of the groove. The third surface 552 is flush with the first end surface 321; or, the third surface 552 is closer to the groove bottom wall 333 of the groove than the first end surface 321.

The third surface 552 is a surface of the first connector 5 farthest from the groove bottom surface of the groove 33, and in an example, the third surface 552 is a surface of the fourth connecting portion 55 facing away from the third connecting portion 54.

In the embodiment shown in FIG. 13, the third surface 552 is closer to the groove bottom wall 333 of the groove than the first end surface 321.

In these embodiments, the third surface 552 is flush with the first end surface 321; or, the third surface 552 is closer to the groove bottom wall 333 of the groove than the first end surface 321, so that the first connector 5 is entirely located in the groove 33, reducing the space occupied by the first connector 5 inside the housing 1. Additionally, when the first tab 21 passes through the second through hole 551 to be connected to the fourth connecting portion 55, the first tab 21 needs to be bent, and the first connector 5 being entirely located in the groove 33 can reduce the risk of the first connecting portion 51 occupying the space for bending the tab, and reduce the risk of local cracking of the first tab 21.

In some embodiments, still referring to FIG. 13 and FIG. 14, the groove 33 has a second groove side surface 3321, and the second groove side surface 3321 is located on a side of the first groove side surface 3311 facing away from the first end surface 321. The first connector 5 has a second outer circumferential surface 541, and the second outer circumferential surface 541 is in a contact fit with the second groove side surface 3321.

The first outer circumferential surface 511 is a closed structure extending along a circumferential direction of the first connector 5, and the second groove side surface 3321 is a closed structure extending along a circumferential direction of the opening of the groove 33. In an example, a groove side surface of the first groove 331 is the first groove side surface 3311, and a groove side surface of the second groove 332 is the second groove side surface 3321. An outer circumferential surface of the third connecting portion 54 of the first connector 5 is the second outer circumferential surface 541. The second outer circumferential surface 541 is in a contact fit with the second groove side surface 3321, that is, the outer circumferential surface of the third connecting portion 54 is in a contact fit with the groove side surface of the second groove 332.

In these embodiments, the second outer circumferential surface 541 is in a contact fit with the second groove side surface 3321, enabling positioning and fitting between the first connector 5 and the electrode terminal 3, facilitating precise welding between the first connector 5 and the electrode terminal 3, and improving the welding quality between the first connector 5 and the electrode terminal 3.

Figure 15:
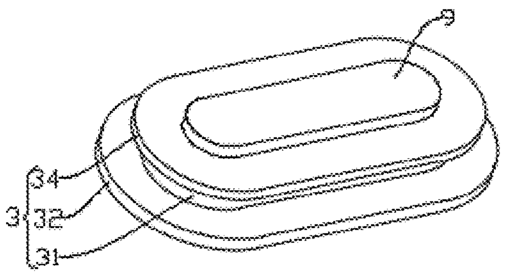
FIG. 15 is an axonometric view of the electrode terminal and the second connector shown in FIG. 14 after connection.

In some embodiments, still referring to FIG. 13 to FIG. 15, FIG. 15 is an axonometric view of an electrode terminal 3 and a second connector 9 shown in FIG. 14 after connection. The battery cell 10 may further include a second connector 9, the second connector 9 is made of a different material from the electrode terminal 3, the second connector 9 and the electrode terminal 3 are composited, and the second connector 9 is located on a side of the electrode terminal 3 facing away from the interior of the housing 1.

The second connector 9 is located on the side of the electrode terminal 3 facing away from the interior of the housing 1, that is, the second connector 9 is located on the outer side of the electrode terminal 3. The second connector 9 is a component composited with the electrode terminal 3 and configured to be connected to an external component, and the external component may be a busbar for achieving electrical connection of a plurality of battery cells 10. The material of the second connector 9 may be the same as the material of the external component, and the material of the second connector 9 may be copper, iron, aluminum, steel, aluminum alloy, or the like.

The second connector 9 and the electrode terminal 3 may be composited through friction welding, so that the second connector 9 and the electrode terminal 3 are fixed, and a surface of the second connector 9 connected to the electrode terminal 3 is a composite interface 53 formed by compositing of the second connector 9 and the electrode terminal 3.

In these embodiments, the second connector 9 may be configured to be connected to an external component, enabling electrical connection between the electrode terminal 3 and the external component made of a different material.

In some embodiments, still referring to FIG. 13 and FIG. 14, along the thickness direction Z of the first wall portion 13, the second connector 9 and the groove bottom wall 333 of the groove are stacked. The groove bottom wall 333 of the groove includes a second connection region 3332, orthographic projections of the second connection region 3332 and the second connector 9 along the thickness direction Z do not overlap, and the second connection region 3332 is welded to the first connector 5 to form the weld mark portion 6.

The second connector 9 is located on a side of the groove bottom wall 333 of the groove facing away from the groove 33. The second connection region 3332 is a portion of the groove bottom wall 333 of the groove not covered by the second connector 9.

In an example, the second connection region 3332 is welded to the third connecting portion 54 of the first connector 5.

In these embodiments, the second connector 9 is less likely to cause interference to the welding of the groove bottom wall 333 of the groove to the first connector 5, making it easier to weld the groove bottom wall 333 of the groove to the first connector 5.

In some embodiments, still referring to FIG. 13 and FIG. 14, when viewed along the thickness direction Z, the second connection region 3332 surrounds an outer side of the second connector 9.

It can be understood that the second connector 9 is located on an inner circumferential side of the second connection region 3332.

In these embodiments, the second connector 9 does not have a portion located on the outer circumferential side of the second connection region 3332, enabling a simpler structure of the second connector 9.

Figure 16:
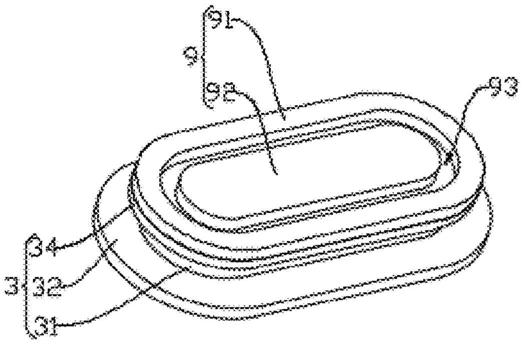
FIG. 16 is an axonometric view of an electrode terminal and a second connector connected according to some other embodiments of this application.

In some embodiments, referring to FIG. 16, FIG. 16 is an axonometric view of an electrode terminal 3 and a second connector 9 connected according to some other embodiments of this application. The second connector 9 has a hollow region 93, and the groove bottom wall 333 of the groove (not shown in FIG. 16) forms the second connection region 3332 at a position corresponding to the hollow region 93.

The hollow region 93 may be a through hole provided in the second connector 9, and the through hole may be a circular hole, a polygonal hole, an annular hole, or the like.

During welding, the groove bottom wall 333 of the groove and the first connector 5 may be welded at the hollow region 93 of the second connector 9, improving welding accuracy and enhancing the welding precision between the groove bottom wall 333 of the groove and the first connector 5.

In some embodiments, still referring to FIG. 16, the second connector 9 includes a fifth connecting portion 91 and a sixth connecting portion 92, both the fifth connecting portion 91 and the sixth connecting portion 92 are connected to the electrode terminal 3, the fifth connecting portion 91 surrounds the sixth connecting portion 92, an annular gap is formed between the fifth connecting portion 91 and the sixth connecting portion 92, and the annular gap is the hollow region 93.

The sixth connecting portion 92 and the fifth connecting portion 91 are both connected to the limiting portion 34 of the electrode terminal 3, the sixth connecting portion 92 is connected to the groove bottom wall 333 of the groove, and the fifth connecting portion 91 is an annular structure surrounding the sixth connecting portion 92. The annular gap formed between the fifth connecting portion 91 and the sixth connecting portion 92 is an annular hole provided in the second connector 9.

During welding, the groove bottom wall 333 of the groove and the first connector 5 may be welded along the annular gap, so that the weld mark portion 6 formed by welding the groove bottom wall 333 of the groove and the first connector 5 extends along an extension direction of the annular gap, which is conducive to enhancing the connection strength between the groove bottom wall 333 of the groove and the first connector 5. Additionally, when the second connector 9 is connected to an external component, both the fifth connecting portion 91 and the sixth connecting portion 92 can contact the external component, increasing a current-carrying area between the second connector 9 and the external component.

In some embodiments, the housing 1 includes a shell 11 and an end cover 12, the shell 11 has an opening, and the end cover 12 seals the opening. The end cover 12 is the first wall portion 13; and/or, at least one wall portion of the shell 11 is the first wall portion 13.

If at least one wall portion of the shell 11 is the first wall portion 13, in an example in which the shell 11 is a cuboid, the shell 11 includes four side walls and one bottom wall, the four side walls surround the bottom wall, the four side walls are sequentially connected end-to-end, and the shell 11 forms an opening at an end opposite the bottom wall, where the bottom wall may be the first wall portion 13, or at least one side wall may be the first wall portion 13.

An embodiment of this application provides a battery 100, including the battery cell 10 according to any one of the above embodiments.

An embodiment of this application provides an electric device, including the battery cell 10 according to any one of the above embodiments.

Referring to FIG. 3 to FIG. 8, an embodiment of this application further provides a battery cell 10, and the battery cell 10 includes a housing 1, an electrode assembly 2, an electrode terminal 3, and a first connector 5. The housing 1 is a cuboid, the housing 1 includes a shell 11 and an end cover 12, the end cover 12 seals an opening of the shell 11, a wall portion of the shell 11 opposite the end cover 12 is a first wall portion 13, and the first wall portion 13 is provided with a lead-out hole 131 running through the first wall portion 13. The electrode assembly 2 includes a negative tab, and the electrode assembly 2 is accommodated in the housing 1. The electrode terminal 3 is disposed on the first wall portion 13 and is electrically connected to the negative tab. The electrode terminal 3 includes a body portion 31 and a flange portion 32, the body portion 31 is at least partially inserted into the lead-out hole 131, and along a thickness direction Z of the first wall portion 13, the flange portion 32 is connected to one end of the body portion 31, the flange portion 32 is located on an outer side of the first wall portion 13, and the flange portion 32 has a first end surface 321 facing away from the body portion 31. The electrode terminal 3 is provided with a groove 33, the groove 33 includes a first groove 331 and a second groove 332, the first groove 331 is provided on the first end surface 321, a groove side surface of the first groove 331 is a first groove side surface 3311, the first groove side surface 3311 is connected to the first end surface 321, the second groove 332 is provided on a groove bottom surface of the first groove 331, and a groove side surface of the second groove 332 is a second groove side surface 3321. The first connector 5 includes a first connecting portion 51 and a second connecting portion 52, the first connecting portion 51 and the second connecting portion 52 are made of different materials, the first connecting portion 51 has a first outer circumferential surface 511 and a first surface 512 facing away from a groove bottom surface of the second groove 332, the first surface 512 is connected to the first outer circumferential surface 511, the second connecting portion 52 is composited on the first surface 512, the first surface 512 is flush with the groove bottom surface of the first groove 331, the first outer circumferential surface 511 is welded to the second groove side surface 3321 to form a weld mark portion 6, and a portion of the first groove side surface 3311 located in the flange portion 32 does not contact the weld mark portion 6.

The first connecting portion 51 seals the second groove 332 to form an accommodating cavity 33*a* inside the electrode terminal 3, the first connecting portion 51 isolates the accommodating cavity 33*a* from the exterior of the housing 1, a groove bottom wall of the second groove 332 is provided with a first through hole 3331, the accommodating cavity 33*a* is in communication with the interior of the housing 1 through the first through hole 3331, the negative tab is inserted into the first through hole 3331 and partially accommodated in the accommodating cavity 33*a*, and a portion of the negative tab located in the accommodating cavity 33*a* is welded to the groove bottom wall of the second groove 332.

In such a battery cell 10, since the first outer circumferential surface 511 is welded to the second groove side surface 3321, the flange portion 32 is unlikely to affect the second groove side surface 3321 during the forming process, and the dimensional accuracy of the second groove side surface 3321 is easily controlled, improving the fitting accuracy between the second groove side surface 3321 and the first outer circumferential surface 511, achieving high-quality welding between the second groove side surface 3321 and the first outer circumferential surface 511, improving the welding quality between the first connector 5 and the electrode terminal 3, and improving the reliability of the battery cell 10. The accommodating cavity 33*a* is formed inside the electrode terminal 3, and the accommodating cavity 33*a* is in communication with the interior of the housing 1 through the first through hole 3331, allowing the accommodating cavity 33*a* to serve as a buffer and temporary storage structure for the electrolyte, thereby enabling the battery cell 10 to accommodate more electrolyte inside, and since the electrolyte is consumed during the charging and discharging processes of the battery cell 10, providing more electrolyte can extend the service life of the battery cell 10; and the accommodating cavity 33*a* can also serve as an accommodating and buffer structure for gases inside the battery cell 10, reducing the swelling of the battery cell 10, and improving the reliability and stability of the battery cell 10. Additionally, the composite interface 53 formed by the compositing of the second connecting portion 52 and the first connecting portion 51 is located outside the accommodating cavity 33*a*, so the electrolyte entering the accommodating cavity 33*a* does not contact the composite interface 53, reducing the risk of corrosion of the composite interface 53 due to local formation of a primary cell 100, and reducing the risk of separation of the first connecting portion 51 and the second connecting portion 52 under the corrosion of the electrolyte.

Referring to FIG. 10 and FIG. 11, an embodiment of this application further provides a battery cell 10, and the battery cell 10 includes a housing 1, an electrode assembly 2, an electrode terminal 3, and a first connector 5. The housing 1 is a cuboid, the housing 1 includes a shell 11 and an end cover 12, the end cover 12 seals an opening of the shell 11, a wall portion of the shell 11 opposite the end cover 12 is a first wall portion 13, and the first wall portion 13 is provided with a lead-out hole 131 running through the first wall portion 13. The electrode assembly 2 includes a negative tab, and the electrode assembly 2 is accommodated in the housing 1. The electrode terminal 3 is disposed on the first wall portion 13 and is electrically connected to the negative tab. The electrode terminal 3 includes a body portion 31 and a flange portion 32, the body portion 31 is at least partially inserted into the lead-out hole 131, and along a thickness direction Z of the first wall portion 13, the flange portion 32 is connected to one end of the body portion 31, the flange portion 32 is located on an outer side of the first wall portion 13, and the flange portion 32 has a first end surface 321 facing away from the body portion 31. The electrode terminal 3 is provided with a groove 33, the groove 33 includes a first groove 331 and a second groove 332, the first groove 331 is provided on the first end surface 321, a groove side surface of the first groove 331 is a first groove side surface 3311, the first groove side surface 3311 is connected to the first end surface 321, the second groove 332 is provided on a groove bottom surface of the first groove 331, and a groove side surface of the second groove 332 is a second groove side surface 3321. The first connector 5 includes a first connecting portion 51 and a second connecting portion 52, the first connecting portion 51 and the second connecting portion 52 are made of different materials, the second connecting portion 52 and the first connecting portion 51 are composited, the first connecting portion 51 covers the groove 33, the second connecting portion 52 is located on a side of the first connecting portion 51 facing away from the first end surface 321, the first connecting portion 51 includes a first connection region 513, orthographic projections of the first connection region 513 and the first connecting portion 51 along the thickness direction Z of the first wall portion 13 do not overlap, the first connection region 513 is welded to the first end surface 321 to form a weld mark portion 6, and a portion of the first groove side surface 3311 located in the flange portion 32 does not contact the weld mark portion 6.

The first connecting portion 51 seals the first groove 331 to form an accommodating cavity 33*a* inside the electrode terminal 3, the first connecting portion 51 isolates the accommodating cavity 33*a* from the exterior of the housing 1, a groove bottom wall of the second groove 332 is provided with a first through hole 3331, the accommodating cavity 33*a* is in communication with the interior of the housing 1 through the first through hole 3331, the negative tab is inserted into the first through hole 3331 and partially accommodated in the accommodating cavity 33*a*, and a portion of the negative tab located in the accommodating cavity 33*a* is welded to the groove bottom wall of the second groove 332.

In such a battery cell 10, since the first connection region 513 is welded to the first end surface 321, the flange portion 32 is unlikely to affect the first end surface 321 during the forming process, achieving high-quality welding between the first connection region 513 and the first end surface 321, and improving the welding quality between the first connector 5 and the electrode terminal 3. The accommodating cavity 33*a* is formed inside the electrode terminal 3, and the accommodating cavity 33*a* is in communication with the interior of the housing 1 through the first through hole 3331, allowing the accommodating cavity 33*a* to serve as a buffer and temporary storage structure for the electrolyte, thereby enabling the battery cell 10 to accommodate more electrolyte inside, and since the electrolyte is consumed during the charging and discharging processes of the battery cell 10, providing more electrolyte can extend the service life of the battery cell 10; and the accommodating cavity 33*a* can also serve as an accommodating and buffer structure for gases inside the battery cell 10, reducing the swelling of the battery cell 10, and improving the reliability and stability of the battery cell 10. Additionally, the composite interface 53 formed by the compositing of the second connecting portion 52 and the first connecting portion 51 is located outside the accommodating cavity 33*a*, so the electrolyte entering the accommodating cavity 33*a* does not contact the composite interface 53, reducing the risk of corrosion of the composite interface 53 due to local formation of a primary cell 100, and reducing the risk of separation of the first connecting portion 51 and the second connecting portion 52 under the corrosion of the electrolyte.

Referring to FIG. 12 to FIG. 15, an embodiment of this application further provides a battery cell 10, and the battery cell 10 includes a housing 1, an electrode assembly 2, an electrode terminal 3, a first connector 5, and a second connector 9. The housing 1 is a cuboid, the housing 1 includes a shell 11 and an end cover 12, the end cover 12 seals an opening of the shell 11, a wall portion of the shell 11 opposite the end cover 12 is a first wall portion 13, and the first wall portion 13 is provided with a lead-out hole 131 running through the first wall portion 13. The electrode assembly 2 includes a negative tab, and the electrode assembly 2 is accommodated in the housing 1. The electrode terminal 3 is disposed on the first wall portion 13 and is electrically connected to the negative tab. The electrode terminal 3 includes a body portion 31 and a flange portion 32, the body portion 31 is at least partially inserted into the lead-out hole 131, and along a thickness direction Z of the first wall portion 13, the flange portion 32 is connected to one end of the body portion 31, the flange portion 32 is located on an inner side of the first wall portion 13, and the flange portion 32 has a first end surface 321 facing away from the body portion 31. The electrode terminal 3 is provided with a groove 33, the groove 33 includes a first groove 331 and a second groove 332, the first groove 331 is provided on the first end surface 321, a groove side surface of the first groove 331 is a first groove side surface 3311, the first groove side surface 3311 is connected to the first end surface 321, the second groove 332 is provided on a groove bottom surface of the first groove 331, and a groove side surface of the second groove 332 is a second groove side surface 3321. The first connector 5 is entirely located in the groove 33, the first connector 5 includes a third connecting portion 54 and a fourth connecting portion 55, the fourth connecting portion 55 is connected to one end of the third connecting portion 54, the third connecting portion 54 surrounds the fourth connecting portion 55, the third connecting portion 54 and the fourth connecting portion 55 jointly define an accommodating space 56, an end of the third connecting portion 54 away from the fourth connecting portion 55 abuts against a groove bottom wall of the second groove 332, an outer circumferential surface of the third connecting portion 54 is a second outer circumferential surface 541, the second outer circumferential surface 541 is in a contact fit with the second groove side surface 3321, the fourth connecting portion 55 has a third surface 552, the third surface 552 is a surface of the first connector 5 farthest from the groove bottom wall of the second groove 332, and the third surface 552 is closer to the groove bottom wall of the second groove 332 than the first end surface 321. The second connector 9 is made of a different material from the electrode terminal 3, the second connector 9 and the electrode terminal 3 are composited, the second connector 9 is located on a side of the electrode terminal 3 facing away from the interior of the housing 1, the groove bottom wall of the second groove 332 includes a second connection region 3332, orthographic projections of the second connection region 3332 and the second connector 9 along the thickness direction Z of the first wall portion 13 do not overlap, the second connection region 3332 is welded to an end of the third connecting portion 54 away from the fourth connecting portion 55 to form a weld mark portion 6, and a portion of the first groove side surface 3311 located in the flange portion 32 does not contact the weld mark portion 6.

The fourth connecting portion 55 is provided with a second through hole 551, the accommodating space 56 is in communication with the interior of the housing 1 through the first through hole 3331, the negative tab is inserted into the first through hole 3331 and partially accommodated in the accommodating space 56, and a portion of the negative tab located in the accommodating space 56 is welded to the fourth connecting portion 55.

In such a battery cell 10, since the second connection region 3332 of the groove bottom wall of the second groove 332 is welded to an end of the third connecting portion 54 away from the fourth connecting portion 55, the groove bottom wall of the second groove 332 is farther from the first groove side surface 3311, and the flange portion 32 is unlikely to affect the groove bottom wall of the second groove 332 during the forming process, achieving high-quality welding between the first connector 5 and the groove bottom wall of the second groove 332, and improving the welding quality between the first connector 5 and the electrode terminal 3. The accommodating space 56 is formed inside the first connector 5, and the accommodating space 56 is in communication with the interior of the housing 1 through the second through hole 551, allowing the accommodating space 56 to serve as a buffer and temporary storage structure for the electrolyte, and enabling the battery cell 10 to accommodate more electrolyte inside, thereby extending the service life of the battery cell 10; and the accommodating space 56 can also serve as an accommodating and buffer structure for gases inside the battery cell 10, reducing the swelling of the battery cell 10, and improving the reliability and stability of the battery cell 10.

It should be noted that, without conflict, the embodiments in this application and the features in the embodiments can be combined with each other.

The above embodiments are only used to illustrate the technical solutions of this application and are not used to limit this application. For those skilled in the art, this application may have various modifications and changes. Any modifications, equivalent replacements, and improvements made without departing from the spirit and principle of this application shall fall within the protection scope of this application.

What is claimed is:

1. A battery cell, comprising:

a housing comprising a first wall portion, wherein the first wall portion is provided with a lead-out hole running through the first wall portion;

an electrode terminal comprising a body portion and a flange portion, wherein the body portion is at least partially inserted into the lead-out hole; and along a thickness direction of the first wall portion, the flange portion is connected to one end of the body portion, the flange portion is located on one side of the first wall portion, and the flange portion has a first end surface facing away from the body portion; the electrode terminal is provided with a groove, and the groove has a first groove side surface connected to the first end surface; and a first connector welded to the electrode terminal to form a weld mark portion, wherein a portion of the first groove side surface located in the flange portion does not contact the weld mark portion, wherein the groove has a second groove side surface, and along the thickness direction, the second groove side surface is located on a side of the first groove side surface facing away from the first end surface; and the first connector comprises a first connecting portion, the first connecting portion is at least partially accommodated in the groove, the first connecting portion has a first outer circumferential surface, and the first outer circumferential surface is welded to the second groove side surface to form the weld mark portion.

2. The battery cell according to claim 1, wherein the groove comprises:

a first groove provided on the first end surface, wherein a groove side surface of the first groove is the first groove side surface; and a second groove provided on a groove bottom surface of the first groove, the first connecting portion is at least partially located in the second groove, and a groove side surface of the second groove is the second groove side surface.

3. The battery cell according to claim 2, wherein the first connecting portion has a first surface facing away from a groove bottom surface of the second groove, and the first surface is connected to the first outer circumferential surface; and the first surface is flush with the groove bottom surface of the first groove; or, the first surface is farther from the groove bottom surface of the second groove than the groove bottom surface of the first groove.

4. The battery cell according to claim 3, wherein the first connector further comprises a second connecting portion, the second connecting portion is made of a different material from the first connecting portion, and the second connecting portion is composited on the first surface.

5. The battery cell according to claim 2, wherein along the thickness direction, the flange portion is located on a side of the first wall portion facing away from an interior of the housing, and the first connector has a second surface farthest from the groove bottom surface of the second groove; and the second surface is flush with the first end surface; or, the second surface is farther from the groove bottom surface of the second groove than the first end surface.

6. The battery cell according to claim 1, wherein the first outer circumferential surface and the second groove side surface are conical surfaces that fit with each other; or, the first outer circumferential surface and the second groove side surface are both parallel to the thickness direction.

7. The battery cell according to claim 1, wherein the first connector covers the groove, and the first connector is welded to the first end surface to form the weld mark portion.

8. The battery cell according to claim 7, wherein the first connector comprises a first connecting portion welded to the first end surface, a thickness of the first connecting portion is $H_1$, a thickness of the flange portion is $H_2$, $H_1/H_2 \leq 0.9$, and optionally, $H_1/H_2 \leq 0.5$.

9. The battery cell according to claim 8, wherein the first connector further comprises a second connecting portion, the second connecting portion is made of a different material from the first connecting portion, and along the thickness direction, the second connecting portion is located on a side of the first connecting portion facing away from the first end surface, and the second connecting portion and the first connecting portion are composited.

10. The battery cell according to claim 9, wherein the first connecting portion comprises a first connection region, orthographic projections of the first connection region and the second connecting portion along the thickness direction do not overlap, and the first connection region is welded to the first end surface to form the weld mark portion.

11. The battery cell according to claim 1, wherein the flange portion is located on a side of the first wall portion facing away from the interior of the housing, wherein the battery cell further comprises an electrode assembly, the electrode assembly is accommodated in the housing, the electrode assembly comprises a first tab, and the first tab is electrically connected to the electrode terminal; and a groove bottom wall of the groove is provided with a first through hole, the first through hole enables communication between the groove and the interior of the housing, and the first tab is inserted into the first through hole and partially accommodated in the groove, wherein the first tab comprises a first tab portion located in the groove, and the first tab portion is connected to the groove bottom wall of the groove; and/or the first connector seals the groove to form an accommodating cavity inside the electrode terminal, the first connector is configured to isolate the accommodating cavity from an exterior of the housing, and the accommodating cavity is in communication with the interior of the housing through the first through hole, wherein the first connector comprises:

a first connecting portion welded to the electrode terminal to form the weld mark portion, wherein the first connecting portion seals the groove; and a second connecting portion made of a different material from the first connecting portion, wherein the second connecting portion and the first connecting portion are composited to form a composite interface, the composite interface being located outside the accommodating cavity, wherein along the thickness direction, the first connecting portion and the second connecting portion are stacked, and the second connecting portion is located on a side of the first connecting portion facing away from the accommodating cavity.

12. The battery cell according to claim 1, wherein the first connector is at least partially accommodated in the groove, and the first connector is welded to a groove bottom wall of the groove to form the weld mark portion, wherein the flange portion is located on a side of the first wall portion facing the interior of the housing, wherein the battery cell further comprises an electrode assembly, the electrode assembly is accommodated in the housing, and the electrode assembly comprises a first tab; and the first connector connects the first tab and the electrode terminal to achieve electrical connection between the first tab and the electrode terminal, wherein the first tab is at least partially accommodated in the groove.

13. The battery cell according to claim 12, wherein the first connector comprises a third connecting portion and a fourth connecting portion, the fourth connecting portion is connected to an end of the third connecting portion, and an end of the third connecting portion away from the fourth connecting portion is welded to a groove bottom wall of the groove to form the weld mark portion; and the third connecting portion surrounds the fourth connecting portion, the third connecting portion and the fourth connecting portion jointly define an accommodating space, the fourth connecting portion is provided with a second through hole, the second through hole enables communication between the accommodating space and the interior of the housing, and the first tab is inserted into the second through hole and partially accommodated in the accommodating space, wherein the first tab comprises a first tab portion located in the accommodating space, and the first tab portion is connected to the fourth connecting portion.

14. The battery cell according to claim 13, wherein along the thickness direction, the first connector has a third surface farthest from the groove bottom wall of the groove; and the third surface is flush with the first end surface; or, the third surface is closer to the groove bottom wall of the groove than the first end surface.

15. The battery cell according to claim 12, wherein the groove has a second groove side surface, and the second groove side surface is located on a side of the first groove side surface facing away from the first end surface; and the first connector has a second outer circumferential surface, and the second outer circumferential surface is in a contact fit with the second groove side surface.

16. The battery cell according to claim 12, wherein the battery cell further comprises a second connector, the second connector is made of a different material from the electrode terminal, the second connector and the electrode terminal are composited, and the second connector is located on a side of the electrode terminal facing away from the interior of the housing, wherein along the thickness direction, the second connector and the groove bottom wall of the groove are stacked; and the groove bottom wall of the groove comprises a second connection region, orthographic projections of the second connection region and the second connector along the thickness direction do not overlap, and the second connection region is welded to the first connector to form the weld mark portion, wherein when viewed along the thickness direction, the second connection region surrounds an outer side of the second connector; and/or the second connector has a hollow region, and the groove bottom wall of the groove forms the second connection region at a position corresponding to the hollow region, wherein the second connector comprises a fifth connecting portion and a sixth connecting portion, both the fifth connecting portion and the sixth connecting portion are connected to the electrode terminal, the fifth connecting portion surrounds the sixth connecting portion, an annular gap is formed between the fifth connecting portion and the sixth connecting portion, and the annular gap is the hollow region.

17. The battery cell according to claim 1, wherein the housing comprises:

a shell having an opening; and an end cover sealing the opening; wherein the end cover is the first wall portion; and/or, at least one wall portion of the shell is the first wall portion.

18. A battery, comprising the battery cell according to claim 1.

19. An electric device, comprising the battery cell according claim 1.

* * * * *